United States Patent
Nordstrom et al.

(10) Patent No.: US 10,701,065 B2
(45) Date of Patent: *Jun. 30, 2020

(54) AUTHENTICATION OF A CLIENT DEVICE BASED ON ENTROPY FROM A SERVER OR OTHER DEVICE

(71) Applicant: Citrix Systems, Inc., Fort Lauderdale, FL (US)

(72) Inventors: Ola Nordstrom, Fort Lauderdale, FL (US); Georgy Momchilov, Parkland, FL (US); Timothy Gaylor, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/710,999

(22) Filed: Sep. 21, 2017

(65) Prior Publication Data

US 2018/0026972 A1   Jan. 25, 2018

Related U.S. Application Data

(63) Continuation of application No. 14/687,737, filed on Apr. 15, 2015, now Pat. No. 9,807,086.

(51) Int. Cl.
*G06F 7/04* (2006.01)
*H04L 29/06* (2006.01)
(Continued)

(52) U.S. Cl.
CPC .......... *H04L 63/0846* (2013.01); *G06F 21/31* (2013.01); *H04L 9/3228* (2013.01); *H04L 63/068* (2013.01); *H04L 63/083* (2013.01)

(58) Field of Classification Search
CPC . H04L 63/0846; H04L 9/3228; H04L 63/068; H04L 63/083; G06F 21/31
(Continued)

(56) References Cited

U.S. PATENT DOCUMENTS 7,111,323 B1   9/2006   Bhatia et al.
8,634,560 B1   1/2014   Ng et al.
(Continued)

FOREIGN PATENT DOCUMENTS

EP   1528455 A1   5/2005
GB   2399724 A    9/2004
(Continued)

OTHER PUBLICATIONS

May 13, 2019—KR—Office Action—App. 10-2017-7032632.
(Continued)

*Primary Examiner* — Mohammad W Reza
(74) *Attorney, Agent, or Firm* — Banner & Witcoff, Ltd.

(57) ABSTRACT

Methods and systems for authenticating a client device using entropy provided by a server and/or a device paired with the client device are described herein. The system may generate static entropy and time-limited entropy based on data from the server and/or the paired device. The static and time-limited entropy may be used to authenticate the client device (application or a user of the client device) in addition to authentication credentials or entropy such as a PIN or password provided by the user. The time-limited entropy may have an expiration time. If the time-limited entropy is expired, the system may request the user to perform a hard authentication with the server, such as by providing a username, password, and/or optionally a two-factor authentication code, among other information.

18 Claims, 20 Drawing Sheets

(51) Int. Cl.
  *G06F 21/31* (2013.01)
  *H04L 9/32* (2006.01)
(58) Field of Classification Search
  USPC .............................................................. 726/7
  See application file for complete search history.

(56) References Cited

U.S. PATENT DOCUMENTS

| | | | |
|---|---|---|---|
| 8,769,289 | B1 | 7/2014 | Kronrod |
| 9,009,230 | B1 | 4/2015 | Matthieu et al. |
| 9,094,407 | B1 | 7/2015 | Matthieu et al. |
| 9,294,476 | B1 | 3/2016 | Lurey et al. |
| 9,325,696 | B1 | 4/2016 | Balfanz et al. |
| 9,692,742 | B1 * | 6/2017 | Vanlund ................. H04L 63/08 |
| 10,122,709 | B2 | 11/2018 | Momchilov et al. |
| 2002/0027992 | A1 | 3/2002 | Matsuyama et al. |
| 2004/0172538 | A1 | 9/2004 | Satoh et al. |
| 2004/0230540 | A1 | 11/2004 | Crane et al. |
| 2005/0097061 | A1 | 5/2005 | Shapiro et al. |
| 2005/0138359 | A1 | 6/2005 | Simon et al. |
| 2006/0105712 | A1 | 5/2006 | Glass et al. |
| 2007/0165854 | A1 | 7/2007 | Higashi et al. |
| 2007/0220591 | A1 | 9/2007 | Damodaran et al. |
| 2008/0112363 | A1 | 5/2008 | Rahman et al. |
| 2008/0159318 | A1 | 7/2008 | Pierlot et al. |
| 2008/0253306 | A1 | 10/2008 | Manion et al. |
| 2009/0146947 | A1 | 6/2009 | Ng |
| 2010/0251352 | A1 | 9/2010 | Zarchy et al. |
| 2011/0016308 | A1 | 1/2011 | Eastman |
| 2011/0223937 | A1 | 9/2011 | Leppanen et al. |
| 2013/0282589 | A1 | 10/2013 | Shoup et al. |
| 2014/0143137 | A1 | 5/2014 | Carlson |
| 2014/0331060 | A1 | 11/2014 | Hayton |
| 2015/0312233 | A1 | 10/2015 | Graham, III et al. |
| 2016/0021152 | A1 | 1/2016 | Maguire et al. |
| 2016/0048114 | A1 | 2/2016 | Matthieu et al. |
| 2016/0072670 | A1 | 3/2016 | Matthieu et al. |
| 2016/0099941 | A1 | 4/2016 | Hein |
| 2016/0262021 | A1 * | 9/2016 | Lee ....................... H04L 63/083 |
| 2016/0277191 | A1 | 9/2016 | Lee et al. |
| 2017/0104738 | A1 | 4/2017 | Brown |
| 2017/0230361 | A1 | 8/2017 | Toth |
| 2017/0235935 | A1 | 8/2017 | Song et al. |
| 2017/0329955 | A1 | 11/2017 | Hessler |
| 2017/0331634 | A1 | 11/2017 | Adams |

FOREIGN PATENT DOCUMENTS

| | | | |
|---|---|---|---|
| JP | H05-333775 | A | 12/1993 |
| JP | 2003242282 | A | 8/2003 |
| JP | 2004201038 | A | 7/2004 |
| JP | 2005141746 | A | 6/2005 |
| JP | 2007188457 | A | 7/2007 |
| JP | 2007293469 | A | 11/2007 |
| JP | 2009-140438 | A | 6/2009 |
| JP | 2014075138 | A | 4/2014 |
| JP | 2014-116953 | A | 6/2014 |
| WO | 2005096157 | A1 | 10/2005 |

OTHER PUBLICATIONS

Mar. 21, 2019—(EP) Examination Report—App. 16713717.3.
Nov. 20, 2018-13 (JP) Office Action—App 2017-554391.
Jun. 26, 2019—(JP) Second Office Action—App. 2017-554391.
"About the Technology," NFC Forum, retrieved on Apr. 3, 2015, <http://nfc-forum.org/what-is-nfc/about-the-technology/>.
"Keep Your Data Secure with the New Advanced Encryption Standard," James McCaffery, MSDN Magazine, Nov. 2003, <http://msdn.microsoft.com/en-us/magazine/cc164055.aspx>.
"arc4random(3) mac OS X Developer Tools Manual Page," BSD Library Functions Manual, Apr. 15, 1997, <https://developer.apple,com/library/mac/documentation/Darwin/Reference/ManPages/man3/arc4random.3.html>.
"bcrypt," Wikipedia, retrieved Apr. 10, 2015, <http://en.wikipedia.org/wiki/bcrypt>.
"Citrix Mouse," Citrix, retrieved Mar. 13, 2015, <http://www/citrix.com/go/citrix-mouse.html>.
"Fast Facts," Bluetooth, retrieved Apr. 3, 2015, <http://www.bluetooth.com/Pages/Fast-Facts.aspx>.
"Security Requirements for Cryptographic Modules," Information Technology Laboratory, Federal Information Processing Standards Publication (FIPS Pub 140-2), Dec. 3, 2002.
"A very fast random number generator," Mersenne Twister, retrieved Apr. 10, 2015, <http://www.math.sci.hiroshima-u.ac.jp/~mat/MT/emt/html>.
"crypt—Manual," PHP, retrieved Apr. 10, 2015, <http://php.net/manual/en/function.crypt.php>.
"PKCS #5: Password-Based Key Derivation Function 2 (PBKDF2) Test Vectors," S. Josefsson, Internet Engineering Task Force, Jan. 2011, <https://tools.ietf.org/html/rfc6070>.
"HMAC-based Extract-and-Expand Key Derivation Function (HKDF)," H. Krawczyk & P. Eronen, Internet Engineering Task Force (ISN: 2070-1721), May 2010.
"scrypt," Wikipedia, retrieved Apr. 10, 2015, <htttp://en.wikipedia.org/wiki/Scrypt>.
"Introduction to Public Key Technology and the Federal PKI Infrastructure," D. Richard Kuhn et al., National Institute of Standards and Technology (SP 800-32), Feb. 26, 2001.
"Recommendation for Key Derivation Using Pseudorandom Functions," Lily Chen, National Institute of Standards and Technology (SP 800-108), Oct. 2009.
"Trusted Platform Module," Wikipedia, retrieved Mar. 27, 2015, <http://en.wikipedia.org/wiki/Trusted_Platform_Module>.
"PKCS #5: Password-Based Cryptography Specification Version 2.0," B. Kaliski, Internet Engineering Task Force, Sep. 2000, <https://www.rfc-based.org/txt/rfc-2898.txt>.
"Citrix XenMobile: Fastest path to mobile productivity," Citrix, 2013.
"Compatible Windows 10 IoT Core Platforms;" Windows Development Center; Last Accessed May 9, 2016; https://ms.-iot.githun.io/content/en-US/BoardComparison.htm.
Rouse, Margaret; Internet of Things (IoT);IoT Agenda; Last Accessed May 9, 2016; http://internetofthingsagenda.techtarget.com/definition/Internet-of-Things-IoT.
Aug. 11, 2016—U.S. Non-final Office Action—U.S. Appl. No. 14/687,737.
"Welcome to Meshblu: Machine to Machine Instant Messaging;" Last Accessed May 9, 2016; https://meshblu.readme.io/
"Trusted Platform Module" from Wikipedia; Last Accessed May 9, 2016; https://en.wikipedia.org/wiki/Trusted_Plafform_Module.
"Raspberry Pi FAQs—Fequently Asked Questions;" Last Accessed May 9, 2016; https://www.raspberrypi.org/help/faqs/.
"Octoblu—Integration of Everything;" Last Accessed May 9, 2016; https://www.octoblu.com/.
Fleck, Chris; "Citrix Workspace Hub and Octoblu Workspace Automation Explained;" Dated May 28, 2015; https://www.citrix.com/blogs/2015/05/28/citrix-workspace-hub-and-octoblu-workspace-automation-explained/.
Sep. 23, 2016—(WO) International Search Report and Written Opinion—App PCT/US16/031962.
Oct. 10, 2016—(PCT) International Search Report and Written Opinion—App No. PCT/US16/23871.
Jan. 26, 2017—U.S. Final Office Action—U.S. Appl. No. 14/687,737.
Jun. 21, 2017—U.S. Notice of Allowance—U.S. Appl. No. 14/687,737.
Oct. 2, 2019—(KR) Decision to Grant—App. 10-2017-7032632.
Sep. 6, 2019—U.S. Non-final Office Action—U.S. Appl. No. 16/164,258.

* cited by examiner

```
Function CreatePin()
{
    tickRollover    = GetDeviceMaximumTickValue()  ⎫
    tickPerSecond   = CalculateTicksPerSecond()    ⎬  718A
    tickNow         = GetCurrentProcessorTickCount() ⎭
    userID          = GetUserID()                  ⎫
    deviceID        = GetDeviceID()                ⎪
    serverPublicKey = GetServerPublicKey()         ⎬  718B
    salt            = CryptGenRandom(128)          ⎭ pin = PromptForPin()
    encryptedDataBlob = Encrypt(serverPublicKey, userID, deviceID,
          722A              pin, tickRollover, tickPerSecond, tickNow,
                            salt)

SecureZeroMemory(pin)
    SendToServerViaTLS(encryptedDataBlob) —— 722B
    SecureZeroMemory(encryptedDataBlob)
}
```

*FIG. 7B*

```
Function Receive-encrypted-data-blob(encryptedBlob)
{
    serverPrivateKey = GetServerPrivateKey()          ⎫
                                                      ⎬ 724A
    blob = Decrypt(serverPrivateKey, encryptedBlob)   ⎭
    SecureZeroMemory(serverPrivateKey);

userID        = GetUserIDFrom(blob)               ⎫
    deviceID      = GetDeviceIDFrom(blob)             ⎪
    pin           = GetPinFrom(blob)                  ⎪
    tickRollover  = GetDeviceMaximumTickValueFrom(blob)⎬ 724B
    tickPerSecond = CalculateTicksPerSecondFrom(blob) ⎪
    tickNow       = GetCurrentProcessorTickCountFrom(blob) ⎭
                                                                724C SaveInDatabase(userID, deviceID, tickRollover, tickPerSecond, tickNow)

signed-expiration-ticket = CreateSigned-expiration-ticket(userID,
                       deviceID, pin, tickRollover, tickPerSecond,
                       tickNow)
    SecureZeroMemory(pin)
    SendToClient(signed-expiration-ticket)
}                                                       734A
```

FIG. 7C

```
Function CreateSigned-expiration-ticket(userID, deviceID, pin,
                                tickRollover, tickPerSecond, tickNow)
{
    time-limited-server-entropy = CryptGenRandom(64)————732A
                                                                    ————726A
    SaveTimeLimitedEntropyInDatabase(userID, deviceID,
                                time-limited-server-entropy)

static-entropy-from-server = FetchStaticEntropyFromServerDatabase(
                                                      userID, deviceID)
            ——732B
    if (!static-entropy-from-server)————732C
    {                                                   ————732D
        static-entropy-from-server= CryptGenRandom(64)     ————728A
        SaveStaticEntropyFromServerInDatabase(userID, deviceID,
                                        static-entropy-from-server)
    }
                                          ————732E
    key-for-static-entropy    = PBKDF2( 100000, pin,
732F—                                       time-limited-server-entropy)
        keyForPin             = PBKDF2( 100000, time-limited-server-entropy,
                                                static-entropy-from-server)
    encryptedPin              = AESEncrypt(keyForPin, pin)
    encrypted-static-entropy  = AESEncrypt(key-for-static-entropy,
732G                                            static-entropy-from-server)

SecureZeroMemory(time-limited-server-entropy)
    SecureZeroMemory(static-entropy-from-server)
    SecureZeroMemory(key-for-static-entropy)
    SecureZeroMemory(keyForPin)
```

```
                                                    ┌─── 732H
nowTime          = GetCurrentGMTTimeInSeconds()
expirationTimeSeconds = CalculateExpirationTimeFrom(nowTime)  ┌─ 732I
lifetimeSeconds  = expirationTimeSeconds - nowTime;─────┘
tickEnd = CalculateExpirationTick(lifetimeSeconds, tickRollover,  732J
                                  tickPerSecond, tickNow);─────┘ clientDevicePublicKey = GetDevicePublicKey(userID, deviceID)
                                                    ┌──── 732K
timeBasedPinValidator = Encrypt(clientDevicePublicKey,
                         expirationTimeSeconds, tickStart, tickEnd,
                         encryptedPin, encrypted-static-entropy)

SaveInDatabase(userID, deviceID, expirationTimeSeconds, tickStart,
          tickEnd, encryptedPin, encrypted-static-entropy) ─┐
                                                            732L
serverPrivateKey = GetServerPrivateKey()                 ┐
signed-expiration-ticket = Sign(serverPrivateKey,        ├ 732M
                                timeBasedPinValidator)   ┘
SecureZeroMemory(serverPrivateKey)

return signed-expiration-ticket
}
```

FIG. 7E

```
Function Receive-signed-expiration-ticket(signed-expiration-ticket)
{
    serverPublicKey = GetServerPublicKey()    812A                    812B if (VerifySignature(serverPublicKey, signed-expiration-ticket) ==
                                                                false)
    {
        /* display error */
        return
    }                                       812C
    Save(signed-expiration-ticket)
}
```

*FIG. 8B*

```
Function VerifyPin(enteredPin)                       812D
{
    correctPin              = false
    serverPublicKey         = GetServerPublicKey()
    signed-expiration-ticket = GetExpirationTicket()           812B if (VerifySignature(serverPublicKey, signed-expiration-ticket) ==
                                                               false)
    {
        /* display error */
        return
    }
                                                               814A
    devicePrivateKey        = GetDevicePrivateKey()
    timeBasedPinValidator   = Decrypt(devicePrivateKey,
                                      signed-expiration-ticket)
    SecureZeroMemory(devicePrivateKey)
                                                               814B
    deviceTimeSeconds       = GetCurrentGMTTimeInSeconds()
    tickNow                 = GetCurrentProcessorTickCount()
    tickStart               = ReadTickStartFrom(timeBasedPinValidator)
    tickEnd                 = ReadTickEndFrom(timeBasedPinValidator)
    encryptedPin            = ReadEncryptedPinFrom(timeBasedPinValidator)
    encrypted-static-entropy = ReadEncryptedStaticEntropyFrom
                                      (timeBasedPinValidator)

if (deviceTimeSeconds >= expirationTimeSeconds)
    {
        /* return error */
        return                                                 814C
    }
                                         814D
    if (tickStart < tickEnd)
    {                                                          814E
        if (tickEnd <= tickNow || tickNow <= tickStart)
        {
            /* return error */
            return
        }
    }
                        •
                        •
                        •
```

```
else
{                                                              ─── 814F
    if (tickEnd <= tickNow && tickNow <= tickStart)
    {
        /* return error */
        return
    }

} userID          = GetUserID()
deviceID        = GetDeviceID()
devicePrivateKey = GetDevicePrivateKey()                       ─── 818A signedUserDeviceID = Sign(devicePrivateKey, userID, deviceID)
SecureZeroMemory(devicePrivateKey)

time-limited-server-entropy = SendToServerViaTLS(signedUserDeviceID)
                                                               ─── 828A
key-for-static-entropy = PBKDF2( 100000, enteredPin,
828B ──────────⎤                      time-limited-server-entropy)
    static-entropy-from-server = AESDecrypt(Key-for-static-entropy,
                                            encrypted-static-entropy)
keyForPin = PBKDF2( 100000, time-limited-server-entropy,
                                            static-entropy-from-server)
decryptedPin = AESDecrypt(keyForPin, encryptedPin)
                                                               ─── 828C
if (enteredPin == decryptedPin)                    ─── 828D
    correctPin = true
else                                      ─── 830A
    SecureZeroMemory(static-entropy-from-server)

SecureZeroMemory(time-limited-server-entropy)
SecureZeroMemory(key-for-static-entropy)
SecureZeroMemory(keyForPin)
SecureZeroMemory(enteredPin)

Return correctPin
}
```

*FIG. 8D*

```
Function Handle-time-limited-server-entropy-request (userID, deviceID,
                                                    signedUserDeviceID)
{
    currentTime = GetGMTTimeInSeconds()
    ticketExpirationTime = GetTicketExpirationTime(userID, deviceID)

if (currentTime >= ticketExpirationTime)
    {
        /* return error */                      820A
        return
    } devicePublicKey = GetPublicKey(userID, deviceID)

if (VerifySignature(signedUserDeviceID, devicePublicKey) == false)
    {
        /* return error */
        return                                  820B
    }                                                       822A time-limited-server-entropy = LookupTimeLimitedServerEntropyInDatabase
                                                    (userID, deviceID)
    SendToClientViaTLS(time-limited-server-entropy)
}                                                       826A
```

*FIG. 8E*

AUTHENTICATION OF A CLIENT DEVICE BASED ON ENTROPY FROM A SERVER OR OTHER DEVICE

CROSS-REFERENCE TO RELATED APPLICATIONS

This application is a continuation of pending U.S. patent application Ser. No. 14/687,737, filed Apr. 15, 2015 and entitled "Authentication of a Client Device based on Entropy from a Server or Other Device." The prior application is incorporated herein by reference in its entirety.

FIELD

Aspects described herein generally relate to computer networking, remote access, and computer security. More specifically, aspects described herein relate to authentication of a client device based on entropy from a server and/or other device, such as a device paired with the client device.

BACKGROUND

Client applications protecting sensitive information typically require a user-supplied PIN to authenticate the user. However, a simple PIN might not provide sufficient security. For example, a six-digit numeric PIN at most provides $10^6$ characters of entropy, which may be used for data security. This may be inadequate to withstand a GPU-based password cracking attack.

A PIN Validator may be used to verify that the user has entered the correct PIN. Current systems may create a PIN Validator by generating a random phrase, encrypting the random phrase with a derivative of the user-supplied PIN, and storing the original random phrase and the encrypted random phrase after hashing each of them a number of times for obfuscation. The PIN validator may be stored on the client device. However, this data security mechanism may be reversed in an offline attack in a matter of hours.

Additionally, the small amount of entropy provided by the user-supplied PIN might not be able to be used for cryptographic key derivation. Although key-stretching algorithms exist, the algorithms are not adequate for government and other regulated environments with strict security standards.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a system and method comprising receiving a request from a client device for time-limited entropy generated by a server, wherein the time-limited entropy comprises an expiration time, and wherein the time-limited entropy is usable to access a static entropy generated by the server. The method may comprise determining whether a current time exceeds the expiration time of the time-limited entropy. If the current time does not exceed the expiration time of the time-limited entropy, the time-limited entropy may be sent to the client device. In some aspects, the entropy may be encrypted. For example, the server may encrypt the time-limited entropy using a public key of the client device and send the time-limited entropy encrypted using the public key of the client device.

The request for the time-limited entropy may be received at the server, and the method may further comprise sending, by the server, a response requesting the client device to perform a hard authentication if the current time exceeds the expiration time of the time-limited entropy. The hard authentication may comprise providing a username and a password or a two-factor authentication code.

The method may further comprise receiving and storing, at a device paired with the client device, the time-limited entropy generated by the server. The request for the time-limited entropy may be received at the device paired with the client device. Sending the time-limited entropy to the client device may be performed by the device paired with the client device. The device paired with the client device may comprise a mouse connected to the client device via Bluetooth, Near Field Communication, Wi-Fi, or USB.

In some aspects, the method may further comprise generating, by the server and using the time-limited entropy, a key for the static entropy. The key may be usable to access the static entropy. The method may further comprise encrypting the static entropy using the key for the static entropy. The encrypted static entropy may be sent to the client device. Generating the key for the static entropy may use a passcode provided by a user at the client device, and the method may comprise generating, by the server and using the static entropy generated by the server, a key for the passcode provided by the user.

Aspects described herein are directed towards a system and method comprising receiving, at a client device, a user credential, which may comprise a passcode. In response to receiving the user credential, the client device may send, to the server or to a device paired with the client device, a request for time-limited entropy generated by a server. The time-limited entropy may expire at a predefined time. The client device may receive the time-limited entropy generated by the server. The client device may also access a stored user credential based on the time-limited entropy generated by the server and static entropy generated by the server. A user of the client device may be authenticated by comparing the received user credential to the stored user credential. After authenticating the user of the first client device, the client device may access data stored in a secure vault. The client device may also send the data stored in the secure vault to a second client device. The data stored in the secure vault may be usable by the second client device to access one or more resources accessible to the first client device.

In some aspects, accessing the stored user credential based on the time-limited entropy and the static entropy may comprise determining a key for the static entropy based on the time-limited entropy, decrypting the static entropy using the key for the static entropy, determining a key for the stored user credential based on the decrypted static entropy, and decrypting the stored user credential using the key for the stored user credential.

In some aspects, accessing the stored user credential based on the time-limited entropy and the static entropy may comprise determining a key for the static entropy based on the received user credential and the time-limited entropy, decrypting the static entropy using the key for the static entropy, determining a key for the stored user credential based on the time-limited entropy and the decrypted static entropy, and decrypting the stored user credential using the key for the stored user credential.

In some aspects, the method may comprise determining, by the client device, that the time-limited entropy has not expired prior to sending the request for the time-limited entropy. In these examples, the request for the time-limited entropy may be sent in response to receiving the user credential and in response to determining that the time-limited entropy has not expired.

The method may comprise the client device locally storing the time-limited entropy. The locally stored time-limited entropy may expire at a second predefined time. The client device may fetch the locally stored time-limited entropy in response to receiving the user credential.

Aspects described herein are directed towards an apparatus comprising a processor and memory. The memory may store computer-executable instructions that, when executed by the processor, cause the apparatus to determine time-limited entropy for a client device, the time-limited entropy having an expiration time. The apparatus may determine static entropy for the client device. A key for the static entropy may be generated using a passcode for a user of the client device and the time-limited entropy, and the passcode may be usable to authenticate the user. A key for the passcode may be generated using the time-limited entropy and the static entropy.

The memory may store additional computer-executable instructions that, when executed by the processor, cause the apparatus to encrypt the static entropy using the key for the static entropy. The apparatus may encrypt the passcode using the generated key for the passcode. The apparatus may also send the encrypted static entropy and the encrypted passcode to the client device.

In some aspects, the memory may store additional computer-executable instructions that, when executed by the processor, cause the apparatus to authenticate a device paired with the client device. The apparatus may encrypt the time-limited entropy with a key accessible by the client device and send the encrypted time-limited entropy and the expiration time to the device paired with the client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7B illustrates an example method of creating a PIN in accordance with one or more illustrative aspects described herein.

FIG. 7C illustrates an example method of a server receiving encrypted data in accordance with one or more illustrative aspects described herein.

FIGS. 7D and 7E illustrate an example method of creating an expiration ticket in accordance with one or more illustrative aspects described herein.

FIG. 8B illustrates an example method of a client device receiving an expiration ticket in accordance with one or more illustrative aspects described herein.

FIGS. 8C and 8D illustrate an example method of verifying a PIN in accordance with one or more illustrative aspects described herein.

FIG. 8E illustrates an example method of a server handling a client request for time-limited entropy in accordance with one or more illustrative aspects described herein.

DETAILED DESCRIPTION

Figure 1:
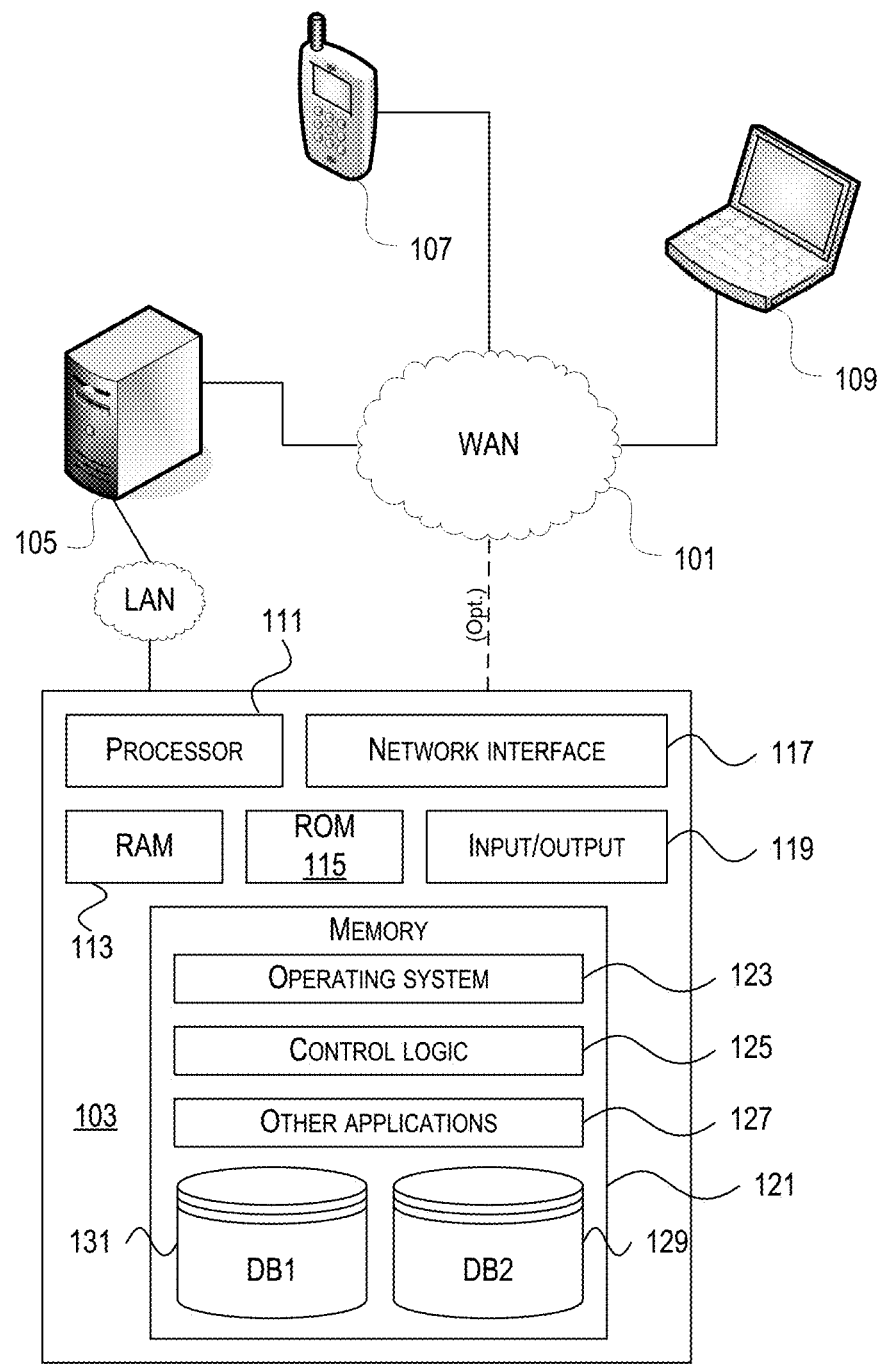
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a system and method for authenticating a client device based on entropy obtained from a server and/or other device, such as a paired device. The system may generate keys, such as cryptographic keys, to unlock data in order to authenticate the client device, application, and/or user of the client device. Data security may be improved because keys generated from server entropy and/or paired device entropy may be stronger than keys generated by a short PIN, such as a 4 digit or 6 digit PIN. During authentication, the client device may receive signed data from the server. The signed data may comprise a time-limited ticket and an encrypted copy of the user's passcode, such as a PIN or a password. An alphanumeric password may provide more entropy than a short numeric PIN. A PIN, on the other hand, may be used more often in government or other regulated environments. A PIN may also be easier to frequently type on a mobile device than a password. For the sake of brevity, a user PIN is described herein for authentication of the user and/or client device. However, a password (or any other passcode) may be used instead of the PIN for authentication.

The time-limited ticket included in the signed data may be valid for a range of hours to days (e.g., 24 hours, 72 hours, etc.). If the current time is within the ticket validity window, a cryptographic key may be used to decrypt the PIN that is stored at the client device. The cryptographic key may comprise key material created on the server. The PIN entered by the user may be compared to the correct PIN to authenticate the user and/or the client device. Keys may also allow the client device to unlock encrypted vaults on the client device that contain additional passwords, certificates, cookies, and other sensitive information.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
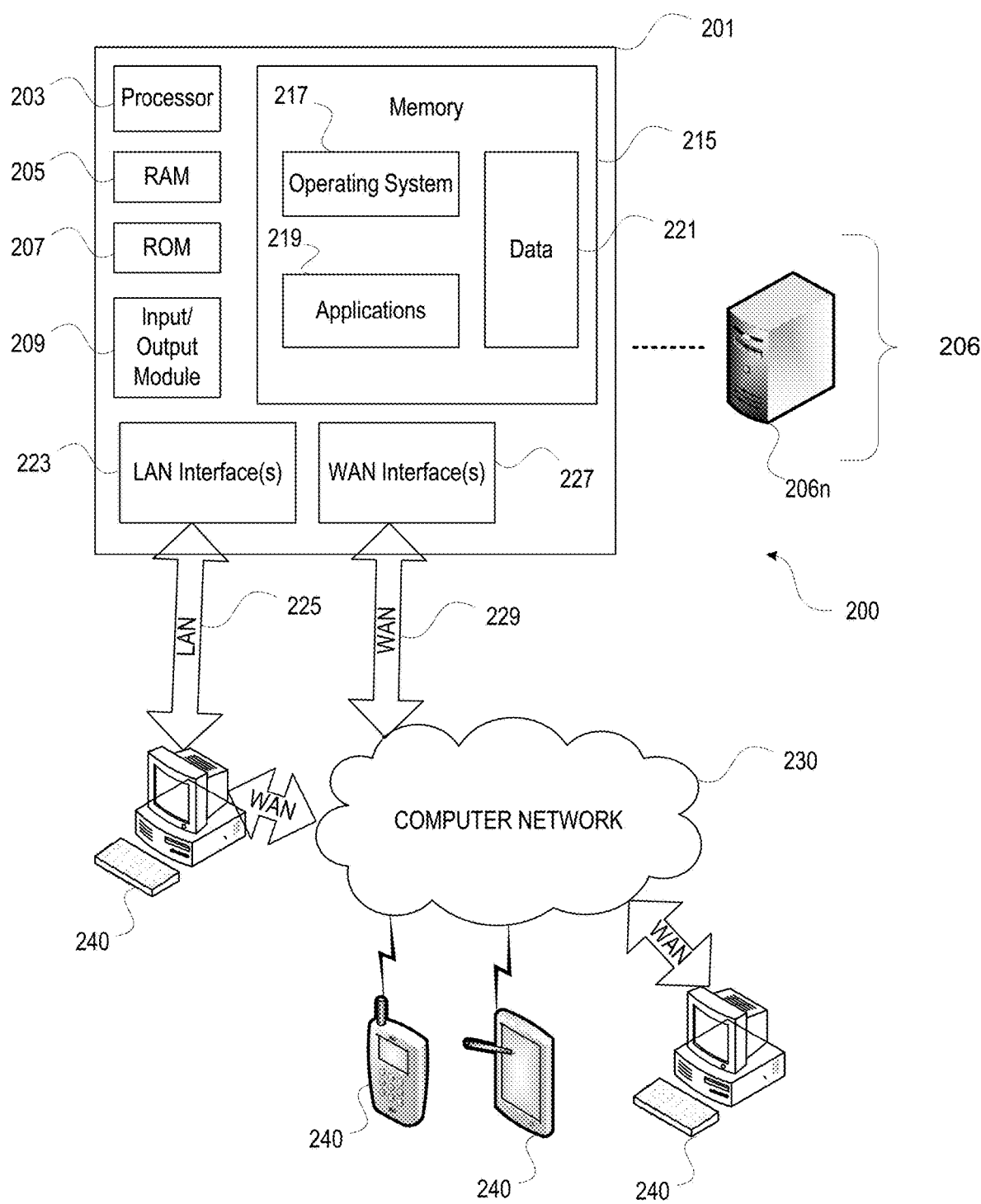
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
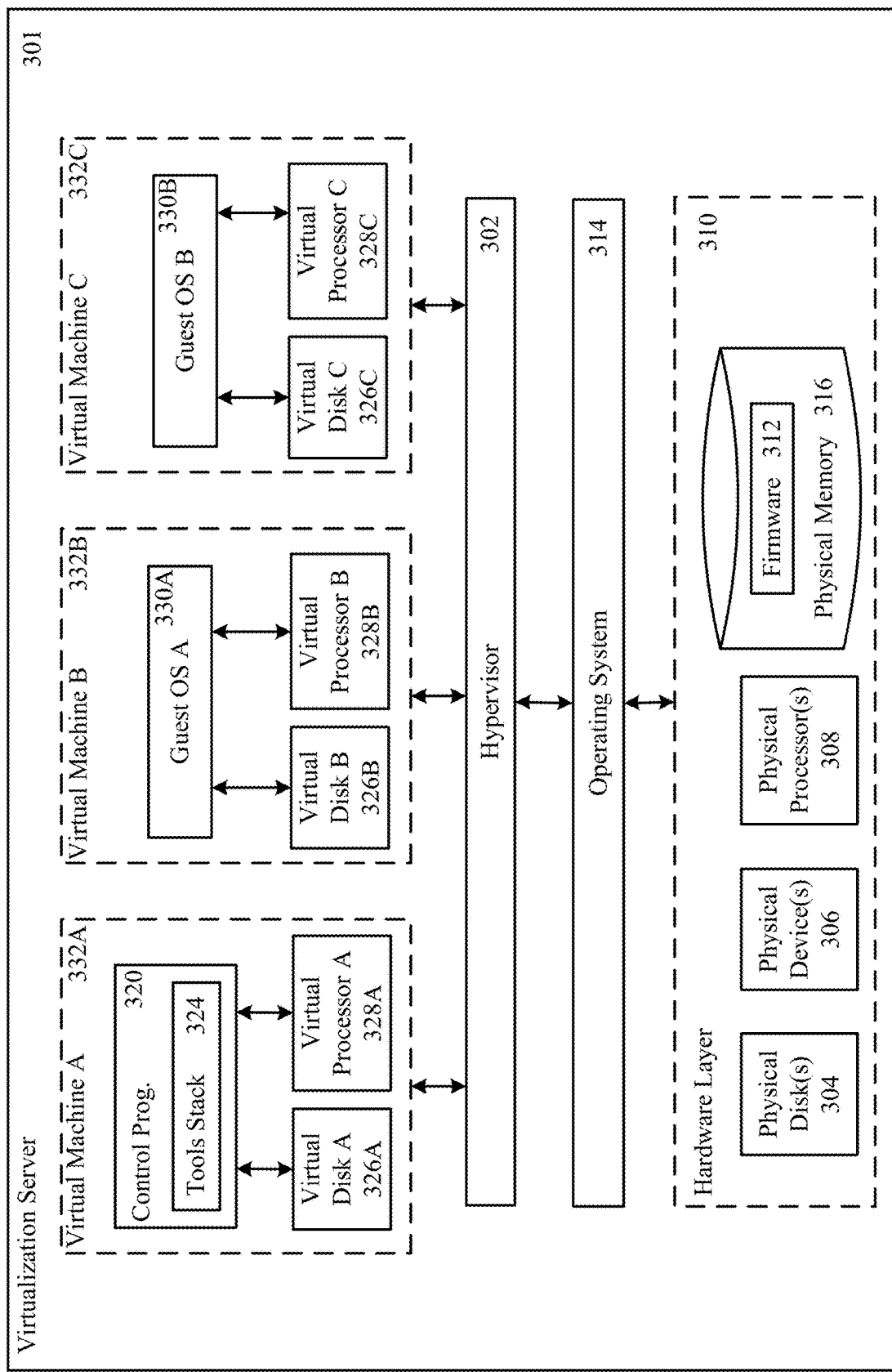
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server

301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
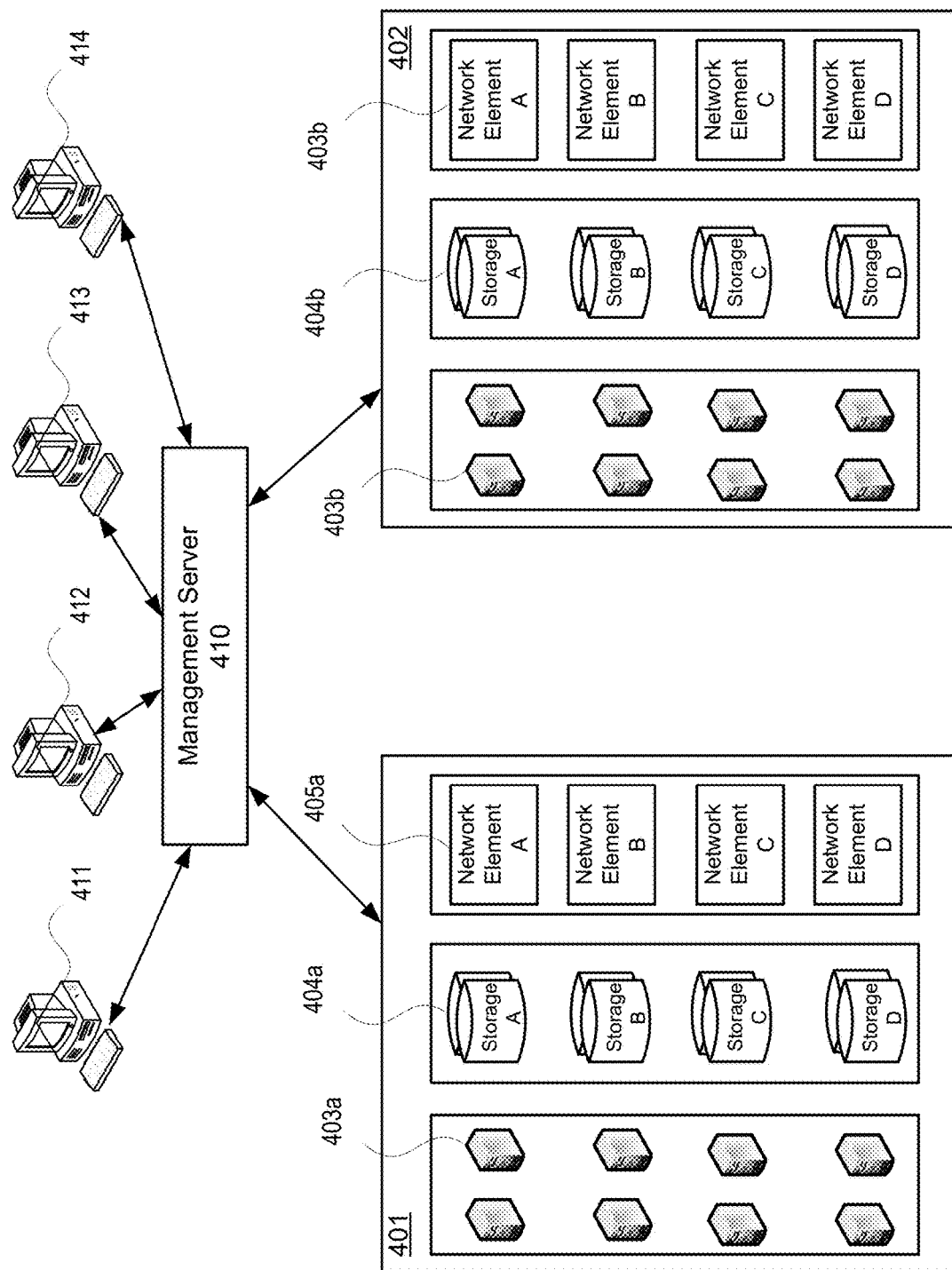
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
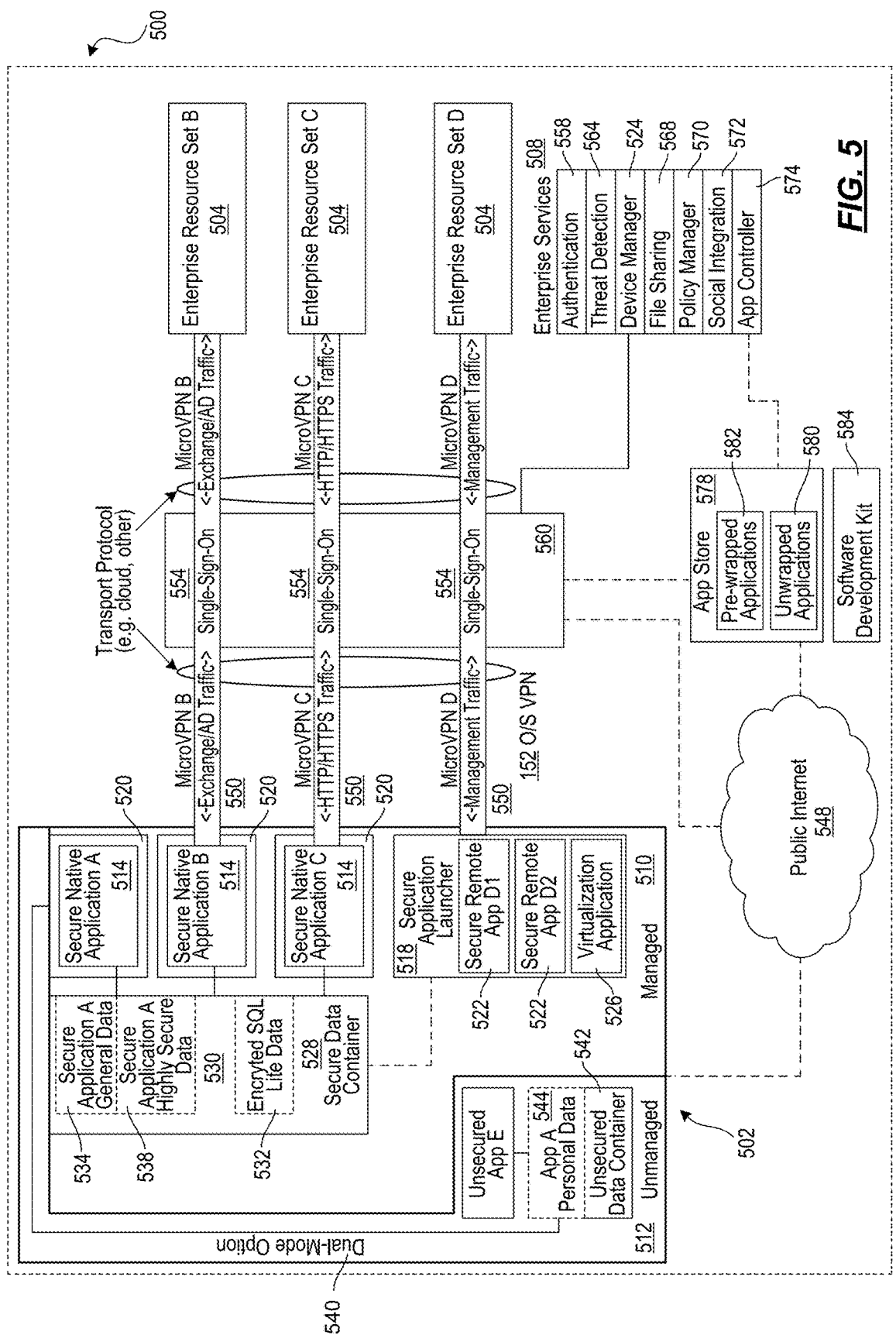
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
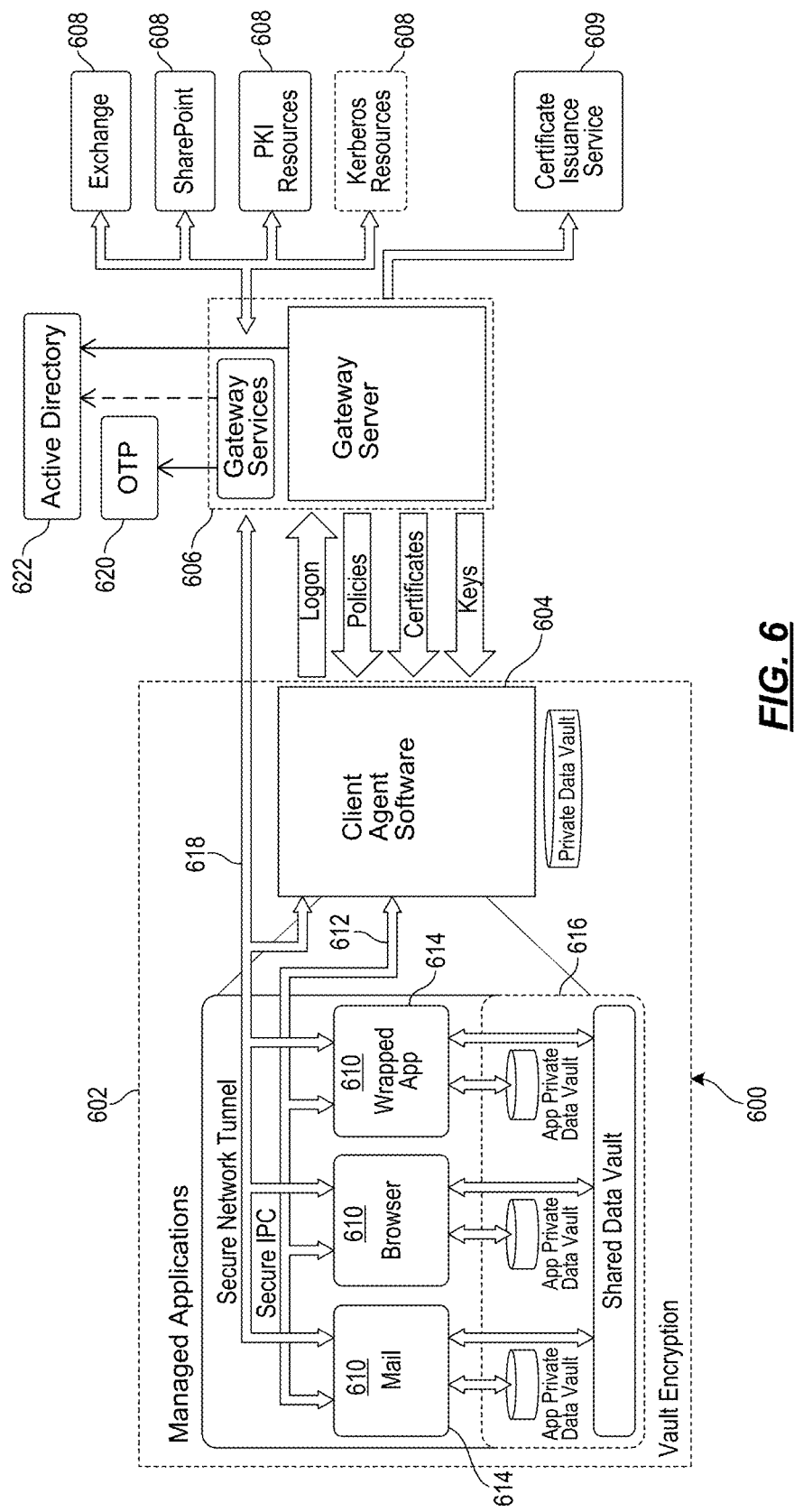
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Authenticating a Client Device

Figure 7A:
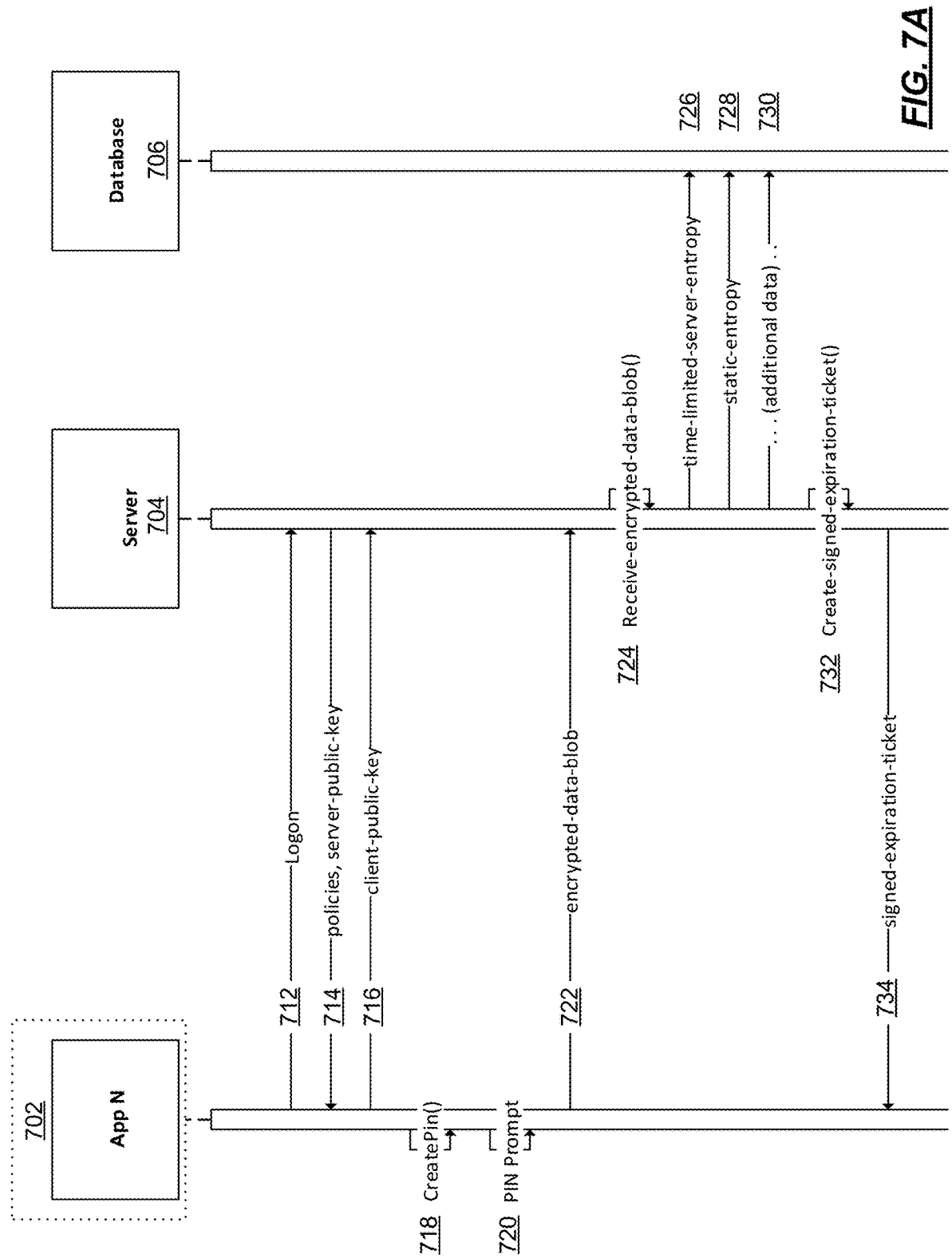
FIG. 7A illustrates an example method of registering a client device in accordance with one or more illustrative aspects described herein.

FIG. 7A illustrates an example method of registering a client device 702 in accordance with one or more illustrative aspects described herein. The client device 702 may comprise any of the client devices previously described, such as terminals 240, client computers 411-414, mobile device 502, or mobile device 602. The client device 702 may also include an application (illustrated as App N), such as the client agent 604 or any other managed and/or trusted application. The server 704 illustrated in FIG. 7A may comprise any of the servers previously described, such as the computing device 201, server 206, virtualization server 301, management server 410, enterprise resources 504, enterprise services 508, access gateway 560, or gateway server 606. The database 706 illustrated in FIG. 7 may comprise any of the databases and/or storage devices previously described. In some aspects, the database 706 may comprise long-term, persistent storage. The database 706 may comprise a device separate from the server 704 or may be integrated in the server 704.

In step 712, the client device 702 may be deployed (e.g., activated) and send a logon request to the server 704. For example, the registration steps illustrated in FIG. 7A may be initiated after an application, such as a mobile application, is installed on the client device 702. To log on, the client device 702 may send user credentials (e.g., username and password, PIN, account number, etc.) to the server 704, and the server 704 may authenticate the client device 702 based on the user credentials. If the client device 702 is logged on in step 712, the method may proceed to step 714.

In step 714, the server 704 may send, to the client device 702, its policies for accessing services provided by the server 704 and a public key of the server 704, such as a cryptographic public key. The client device 702 may receive the public key of the server 704 and store it in memory.

In step 716, the client device 702 may send, to the server 704, a public key of the client device 702, such as a cryptographic public key. In other words, the client device 702 and server 704 may exchange public keys used to decrypt exchanged data. The server 704 may receive and store the received public key.

In steps 718 and 720, credentials, such as a PIN, passcode, biometrics, smartcard credentials, or any other type of credential, may be created for a user of the client device 702. A PIN may be created each time the user desires to create a PIN, whether for the first time or the user changes the PIN.

FIG. 7B illustrates an example method of creating a PIN on the client device 702 in accordance with one or more illustrative aspects described herein. The CreatePin( ) function illustrated in FIG. 7B may also be used to generate an encrypted data blob and to send the encrypted data blob to the server 704, as will be described in further detail below with respect to step 722.

With brief reference back to FIG. 7A, in step 720, the client device 702 may prompt the user to enter a PIN, such as a four or six digit PIN. The user may be prompted to enter the PIN twice in order to confirm the chosen PIN. In step 722, the client device 702 may generate an encrypted data blob to send to the server 704. Returning to FIG. 7B and with reference to element 718B, the data blob may include a user ID (e.g., a username, user account number, etc.) and/or a device ID (e.g., a MAC address, a serial number, an IMEI number, etc.). The data blob may also include a random or pseudorandom number, which is referred to as "salt" in the pseudo code illustrated in FIG. 7B. The random or pseudo-random number may be, for example, 128 bytes long.

With reference to element 718A, the data blob may also include time data, which may be used to generate a time-limited ticket or key, as will be described in further detail in the examples below. In some aspects, the time data may comprise a tick count of a processor of the client device 702. For example, the time data may comprise a maximum tick value (e.g., the value at which the processor tick count will roll over), a conversion of the number of ticks to seconds (e.g., the ticks per second), and the current processor tick count. The client device 702 may use the processor's tick count rather than the device's clock time because the time can easily be modified on some devices and are thus less secure.

In step 722A (and similarly step 722 illustrated in FIG. 7A), the client device 702 may encrypt the data blob, including the user's PIN, the metadata identifying the client device and/or user, and the time data. The data blob may be encrypted using the server's public key. In step 722B, the client device 702 may send the encrypted data blob to the server 704 via TLS, SSL, or any other encryption protocol. The client device 702 may also securely clear from its memory (e.g., scrub or overwrite) the PIN and/or the data blob by calling, for example, the SecureZeroMemory( ) function or any other function to securely remove the PIN and/or the data blob from memory.

With brief reference back to FIG. 7A, in step 724, the server 704 may receive the encrypted data blob from the client device 702. In response to receiving the data, the server 704 may perform various processes on the data. FIG. 7C illustrates an example method of the server 704 receiving the encrypted data and processing it in accordance with one or more illustrative aspects described herein.

In step 724A, the server 704 may retrieve its private key and decrypt the encrypted data blob with the private key to access the data blob. As previously described, the data 724B may include a user ID, a device ID, a PIN, a maximum tick value, a ticks to second ratio, and/or a current processor tick count. In step 724C, the server 704 may store one or more pieces of the information in the database 706. The server 704 may also securely clear from its memory the user's encrypted PIN and/or the server's private key.

Returning to FIG. 7A, in steps 726, 728, 730, and 732, the server 704 may generate a signed expiration ticket for the client device 702. The expiration ticket may comprise static server entropy generated by the server 704 for the client device 702. In step 728, the server 704 may store, in the database 706, the static entropy with additional client device metadata. The metadata may comprise information identifying the client device 702, such as the user ID and/or device ID. The static entropy may be the same for all expiration tickets belonging to a specific client device, such as client device 702. In other words, the server 704 may generate the static entropy once for a particular client device, for the life of the client device. The server 704 may also encrypt and send the static entropy to the client device 702 (not illustrated).

The expiration ticket may also comprise dynamic, time-limited server entropy generated by the server 704 for the client device 702. In step 726, the server 704 may store the dynamic entropy with client metadata in database 706. The time-limited server entropy may change each time a new expiration ticket is created. In some aspects, unlike the static server entropy, the time-limited server entropy is not stored on the client device 702. Instead, it may be fetched from the server 704 (or from a paired device, as described later) and immediately erased by the client device 702 after each use.

The expiration ticket may also comprise a key derivation function (KDF) that uses the PIN, the static entropy, and the dynamic entropy to create cryptographic keys. The cryptographic keys may be used to encrypt the user's PIN and encrypt the static server entropy. In step 730, the server 704 may optionally store additional data in the database 706, including, for example, additional device identifying information such as information identifying the user or owner of the client device 702, the time the client device 702 was registered (e.g., enrolled), and/or additional audit data.

In step 732, the server 704 may generate the signed expiration ticket. FIG. 7D and FIG. 7E illustrate an example method of creating an expiration ticket in accordance with one or more illustrative aspects described herein. The server 704 may call the CreateSigned-expiration-ticket( ) function to generate the ticket. Inputs to this function may include the user ID, the device ID, the PIN, the maximum tick value, the ticks per second, and/or the current tick value.

In some aspects, the CreateSigned-expiration-ticket( ) function may be called each time the client device 702 (or any other client device) requests a signed expiration ticket from the server 704, including after a hard authentication by the client device 702. A hard authentication may comprise verification of a username and password, and optionally a two-factor authentication code. With reference to FIG. 7D, in step 732A, the server 704 may generate a random number using a random number generator. The random number may comprise 64 cryptographically random bytes from a Federal Information Processing Standard Publication Series (FIPS) random number generator module. Other exemplary random number generators that may be used include the Mersenne Twister random number generator and the arc4random random number generator. The server 704 may set the generated random number as the dynamic, time-limited server entropy.

In step 726A (and similarly step 726 illustrated in FIG. 7A), the server 704 may store the time-limited server entropy in the database 706. The entropy may be stored with the user ID, device ID, and/or any other information identifying the client device 702.

In step 732B, the server 704 may request and receive, from the database 706, the static server entropy for the client device 702, which may have previously been generated and stored in the database 706. If, on the other hand, the server determines, in step 732C, that static server entropy for the client device 702 is not stored in the database 706, the server 704, in step 732D, may generate the static entropy. For example, this might be the first time that the client device 702 has requested a signed expiration ticket and static entropy has not yet been generated. In step 728A (and similarly in step 728 illustrated in FIG. 7A), the server 704 may store the static server entropy in the database 706. The entropy may be stored with the user ID, device ID, and/or any other information identifying the client device 702.

In step 732E, the server 704 may generate an encryption key for the static entropy. For example, the server 704 may use a key derivation function (KDF), such as Password-Based Key Derivation Function 2 (PBKDF2). Inputs to the KDF may include the number of KDF rounds to perform (e.g., 100,000 rounds), the PIN, and/or the time-limited server entropy. In other words, the key for the static entropy may be based on the time-limited entropy. The number of rounds of the key derivation function is variable and can be more or less than 100,000 rounds.

FIGS. 7D and 7E illustrate an example where the user is authenticated using a PIN. The static entropy is encrypted by a key generated by inputting both the PIN and time-limited server entropy into the KDF. Thus, the static entropy would be decrypted using a key generated based on both the PIN and time-limited server entropy, as illustrated in the following portion of pseudo code.

```
key-for-static-entropy = KDF(entered-pin, time-limited-server-entropy)
static-entropy = Decrypt(key-for-static-entropy, encrypted-static-entropy)
```

In alternative aspects, the user may be authenticated without having to enter a PIN. To create the static entropy without requiring the user to enter a PIN, the server 704 may execute the KDF based on the time-limited server entropy, but not the PIN. Thus, the static entropy would be decrypted using a key generated based on the time-limited server entropy, but not the PIN, as illustrated in the following portion of pseudo code.

```
key-for-static-entropy = KDF(time-limited-server-entropy)
static-entropy = Decrypt(key-for-static-entropy, encrypted-static-entropy)
```

There is a security tradeoff between using a PIN and not using a PIN. As will be described in further detail below, additional layers of security may be used in the PIN-less case. For example, the client device 702 may be required to be within communication range of a paired device, such as a mouse, or other device registered with the server 704 in order to authenticate. Returning to the example where the PIN is used (FIG. 7D), the server 704, in step 732F, may generate an encryption key for the user's PIN, such as by using PBKDF2. Exemplary inputs to the KDF for the PIN encryption key may include the number of KDF rounds to perform (e.g., 100,000 rounds), the time-limited server entropy, and/or the static server entropy. Accordingly, the key for the static entropy and the key for the PIN may be different, and encrypted data sent to the client device 702 may consequently be different. Moreover, by using both time-limited entropy and static entropy for the key for the PIN, the input to the KDF may be longer and consequently harder to break. Other examples of KDFs that the server 704 may use to generate keys for the static entropy and/or PIN may include, for example, the Unix crypt( ) function, the bcrypt( ) function, the scrypt( ) function, the HMAC-based Extract-and-Expand Key Derivation Function (HKDF), etc.

In step 732G, the server 704 may encrypt each of the user's PIN and the static entropy using the generated encryption keys. The server 704 may use conventional encryption standards, including for example, the Advanced Encryption Standard. Inputs to the encryption algorithm for encrypting the PIN include the PIN and the encryption key for the PIN. Inputs to the encryption algorithm for encrypting the static entropy include the static entropy data and the encryption key for the static entropy. The time-limited server entropy and the static entropy previously described may be stored in secure memory, such as in the database 706. The server 704 may also securely clear from its memory the key for the static entropy and the key for the user's PIN.

FIG. 7E illustrates a continuation of the example method of creating the expiration ticket in FIG. 7D in accordance with one or more illustrative aspects described herein. The server 704 may determine whether the expiration time for the time-limited server entropy has expired. In step 732H, the server 704 may determine the current time at the server (e.g., nowTime). In some aspects, the server 704 may use a particular time zone as the base time to avoid time zone issues. For example, the server 704 may use the Greenwich Mean Time (GMT).

The server 704 may also calculate an expiration time, such as the time that a client device PIN validator will expire at the client device. The expiration time may be based on an expiration policy, which may be set by an administrator. The server 704 may input the current time (e.g., nowTime) into the CalculateExpirationTimeFrom( ) function to calculate the expiration time (e.g., expirationTimeSeconds).

In step 732I, the server 704 may calculate the amount of time between the current time and the expiration time of the ticket (e.g., the lifetimeSeconds). If the server 704 uses the client device's tick value (rather than time value), the server 704, in step 732J, may calculate the expiration tick count (e.g., tickEnd). For example, the server 704 may input the lifetimeSeconds value, the tickRollover value, the tickPerSecond value, and the tickNow value into a function used to calculate the expiration tick count. The expiration tick count may comprise the expected tick count at the client device 702 when the ticket expires.

As an example for calculating the expiration tick count (e.g., tickEnd), assume that the lifetimeSeconds value is 50, the tickRollover value is 1000, the tickPerSecond value is 10, and the tickNow value is the current tick value (e.g., TNow). The lifetimeSeconds may be converted to ticks (e.g., 50 lifetimeSeconds×10 tickPerSecond=500 ticks). This example is illustrated in the following diagram.

0|-------------TNow-------------|1000

If TNow is less than 500, then step 814D (as will be described below) is true, and tickStart has a lower value than tickEnd, as illustrated in the following diagram.

0|--tickstart--------tickend----|1000
0|-------------TNow-------------|1000

Accordingly, the algorithm determines whether TNow is in between the tick start and tick end values. If not, then TNow is either greater than tickEnd or less than tickStart (e.g., step 814E, as will be described below, is true). On the other hand, if TNow is greater than or equal to 500, TNow will wrap around tickRollover, as illustrated in the following diagram.

0|------tickEnd--tickStart-------|1000
0|-TNow-----------------Tnow-|1000

If there is a wrap around, TNow is still "between" the tickStart and tickEnd values. However, due to the wrap around, TNow is greater than tickStart or less than tickEnd, and step 814F is false, as will be described below. One reason for computing the expiration tick count (rather than using the expiration time value in seconds) is to ensure that the client device 702 cannot simply reset the local time value to artificially increase the time in which a ticket is valid. This security feature may be used because the tick count at the processor of the client device 702 may constantly be increasing until the tick count wraps around to zero (e.g., reaches the maximum tick value or tickRollover).

In step 732K, the server 704 may generate a time-based validator, such as a PIN validator (e.g., timeBasedPinValidator), by encrypting one or more of the information previously described. For example, the server may encrypt the expiration time at the client device 702 when PIN validator expires (in seconds), the tick count at the processor of the client device 702 when the PIN validator expires (and similarly the tick count at the processor of the client device 702 when the PIN validator was created), the encrypted PIN, the encrypted static entropy, and/or the KDF used to generate one or more encryption keys. The time-based PIN validator may be encrypted using the public key of the client device 702. In step 732L, the server 704 may also save one or more of this information to the database 706, in association with a client device identifier, such as the user's ID or the client device's ID.

In step 732M, the server 704 may retrieve the server's private key and sign the time-based PIN validator using the server's private key. The encrypted and signed PIN Validator may be referred to as a signed expiration ticket which may be the PIN validator which consists of the data the client device 702 uses to construct and/or compute the PIN validation function. The CreateSigned-expiration-ticket( ) illustrated in FIGS. 7D and 7E may return the signed expiration ticket to the server 704. Returning to FIG. 7A, the server 704 may send the signed expiration ticket to the client device 702 in step 734 (and similarly in step 734A illustrated in FIG. 7C).

In some aspects, the PIN validator at the client device 702 may check one or more of the client device time and a tick count at the processor of the client device to determine whether the PIN validator has expired. The server 704 may also enforce the expiration time in parallel before the server 704 sends the time-limited server entropy to the client device 702. The purpose of the client device 702 also checking is to avoid unnecessary round-trip communication with the server 704.

Figure 8A:
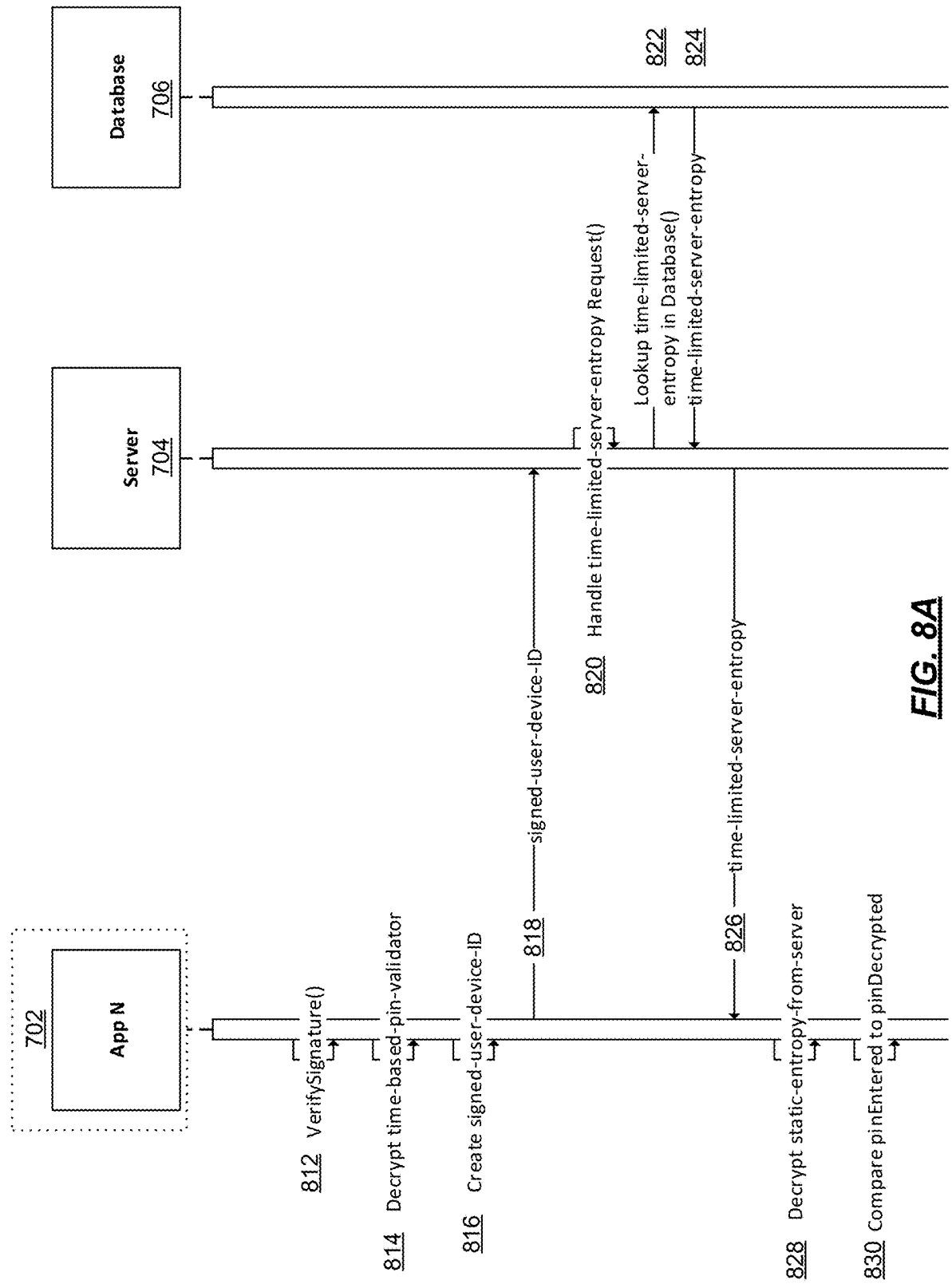
FIG. 8A illustrates an example method of validating a client device identifier in accordance with one or more illustrative aspects described herein.

FIG. 8A illustrates an example method of validating a client device 702 identifier, such as the PIN, in accordance with one or more illustrative aspects described herein. For example, the method may comprise a PIN validation procedure, and PIN validation may occur if the trusted App on the client device 702 authenticates the user of the client device 702 by challenging the user to enter the correct PIN.

In step 812, the client device 702 may verify the signature of the signed expiration ticket in response to receiving the ticket from the server 704. FIG. 8B illustrates an example method of a client device receiving an expiration ticket (and verifying the signature) in accordance with one or more illustrative aspects described herein.

In some aspects, the client device 702 may verify the signature each time the client device 702 performs a hard authentication with the server 704 to obtain a new expiration ticket. In step 812A, the client device 702 may retrieve the server's public key, which may have previously been stored by the client device 702. In step 812B, the client device 702 may verify the signature of the signed expiration ticket using the server's public key. If the signature cannot be verified, the client device 702 may display an error and optionally discard the data. If the expiration ticket's signature is valid, the client device 702 may decrypt the timed-based PIN validator using the client device's private key in step 814 (illustrated in FIG. 8A). The client device 702 may optionally store the signed expiration ticket in step 812C.

FIGS. 8C and 8D illustrate an example method of verifying a PIN in accordance with one or more illustrative aspects described herein. The Receive-signed-expiration-ticket( ) function illustrated in FIG. 8B may be included in the VerifyPin( ) function illustrated in FIG. 8C. The method illustrated in FIGS. 8C and 8D may be used to verify the user's entered PIN on the client device 702 and may be called each time the PIN is to be verified. As will be explained below, if PIN verification is successful, static server entropy may be returned, and the static server entropy may be optionally used (depending on policy) to create one or more keys to unlock one or more secure vaults, such as vaults 616.

With reference to FIG. 8C, in step 812D, the client device 702 may reset (e.g., set to false) the trigger indicating that the entered PIN is correct (e.g., correctPin). The client device 702 may also retrieve the server's public key and the signed expiration ticket. In step 812B, the client device 702 may verify the signature of the signed expiration ticket by calling the VerifySignature( ) function and inputting the server public key, as previously explained. If the signature cannot be verified, the client device 702 may display an error and optionally discard the data. The client device 702 may also instruct the user to perform a hard authentication with the server 704. By verifying the signature of the expiration ticket, the client device 702 may prevent the expiration ticket from being tampered with, such as on a jail broken device. In step 814A (and similarly step 814 illustrated in FIG. 8A), if the expiration ticket's signature is valid, the client device 702 may retrieve the client device's private key and use it to decrypt the expiration ticket to obtain the time-based PIN validator.

Once the client device 702 has access to the time-based PIN validator, the client device 702 may determine whether the expiration ticket has expired. In step 814B, the client device 702 may determine the current device time in seconds (e.g., deviceTimeSeconds) and the current tick count of the client device processor (e.g., tickNow). The client device 702 may also read time or tick data from the expiration ticket, including the tick start count (e.g., tickStart) and/or the tick end count (e.g., tickEnd). The client device 702 may also access the encrypted PIN (e.g., encryptedPin) and/or the encrypted static server entropy (e.g., encrypted-static-entropy).

In step 814C, the client device 702 may determine whether the current device time is greater than or equal to the expiration time. If so, the ticket has expired, and the client device 702 may return an error and instruct the user to perform a hard authentication with the server 704. If not, the client device 702, in step 814D, may determine whether the tick start count is less than the tick end count. If so, the client device 702 may determine, in step 814E, whether (1) the tick end count is less than or equal to the current tick count or (2) the current tick count is less than or equal to the tick start count. In either case (1) or (2), the client device 702 may determine that the tick count has rolled over and accordingly that the ticket has expired. The client device 702 may return an error and instruct the user to perform a hard authentication with the server 704.

With reference to FIG. 8D, if neither case (1) nor case (2) is true, the client device 702 may determine, in step 814F, whether the tick end count is less than or equal to the current tick count and the current tick count is less than or equal to the tick start count. If so, the client device 702 may determine that the tick count has rolled over and accordingly that the ticket has expired. The client device 702 may return an error and instruct the user to perform a hard authentication with the server 704. If either the tick end count is greater than the current tick count or the current tick count is greater than the tick start count, the client device 702 may determine that the ticket has not expired and proceed to step 816 illustrated in FIG. 8A.

In step 816, the client device 702 may create a signed-user-device-ID request. This request may comprise the user's ID and/or the client device ID. In step 818 (and similarly step 818A illustrated in FIG. 8D), the client device 702 may digitally sign the request using the client device's private key and send the signed request to the server 704. In other words, the client device 702 may send a request to the server 704 to fetch the time-limited server entropy for the client device 702. The time-limited server entropy, once received, may be used to decrypt the correct PIN in order to validate the PIN entered by the user. If the client device 702 encounters errors in communicating with the server 704 during the PIN validation process, the client device 702 may instruct the user to perform a hard authentication with the server 704.

In step 820, the server 704 may receive the signed request for the time-limited server entropy. FIG. 8E illustrates an example method of the server 704 handling a client request for time-limited entropy in accordance with one or more illustrative aspects described herein.

In step 820A, the server 704 may compare the current time to the expiration time of the time-limited ticket, which may be stored in the database 706. The time-limited ticket may be identified using the user ID and/or the client device ID. If the current time is greater than or equal to the expiration time of the ticket, the server 704 may determine that the ticket has expired, return an error, and request the user to perform a hard authentication with the server 704 (e.g., using the user's username, password, and optionally two-factor authentication code).

If the ticket has not expired, the server 704, in step 820B, may attempt to validate the digital signature on the request. In particular, the server 704 may obtain the public key of the client device 702 using the user ID and/or the client device ID. If the signature on the request is invalid, the server 704 may return an error and request the user to perform a hard authentication with the server 704. On the other hand, if the signature on the request is valid, the server 704, in step 822A (and similarly step 822 illustrated in FIG. 8A), may request the time-limited server entropy from the database 706.

Returning to FIG. 8A, in step 824, the database 706 may return the time-limited server entropy to the server 704. In step 826 (and similarly step 826A illustrated in FIG. 8E), the server 704 may encrypt the entropy using the client device's public key and send the time-limited entropy to the client device 702. For example, the time-limited entropy may be secured using TLS or SSL.

In another example, the client device 702 may store (e.g., cache) the time-limited server entropy. Caching may be allowed based on policy configuration as a trade-off between security and usability. If the client device 702 caches the time-limited server entropy, then PIN validation could be performed offline (e.g., without connectivity to the server 704). The cache expiration time may be determined based on a fixed time period, a client application lifetime, and/or a period of user inactivity. The cached time-limited server entropy may be encrypted with the public key of the client device 702, as it was received from the server 704. Additionally or alternatively, the cached time-limited server entropy may be encrypted with a user credential, such as the PIN. In these examples, the client device 702 may fetch the cached time-limited server entropy in response to receiving the user credential, rather than sending a request for the time-limited server entropy to the server 704.

In step 828, the client device 702 may decrypt the received time-limited server entropy using the client device's private key. For example and with reference to FIG. 8D, in step 828A, the client device 702 may use the time-limited server entropy and the entered PIN to derive a cryptographic key for the static entropy using a key derivation function, such as PBKDF2. The client device 702 may input the number of KDF rounds (e.g., 100,000), the PIN entered by the user, and the time-limited server entropy received from the server 704 into the PBKDF2( ) function illustrated in FIG. 8D. In step 828B, the client device 702 may use the key to decrypt the static entropy previously received as part of the PIN Validator from the server 704. As previously explained, the static server entropy may have been encrypted using the time-limited server entropy and may be accessed by the client device 702 if the expiration time has not been reached. In step 828C, the client device 702 may use the static entropy and the time-limited entropy to derive another cryptographic key, e.g., a key used to unlock the PIN, using a KDF. For example, the key derivation function for determining the key for the PIN may also comprise the PBKDF2( ) function. In step 828D, the client device 702 may use the derived key for the PIN to decrypt the encrypted PIN.

In step 830A (and similarly step 830 illustrated in FIG. 8A), the client device 702 may compare the decrypted PIN with the PIN entered by the user. If the PINs do not match, the client device 702 may prompt the user to reenter the user's PIN. The procedure may be repeated, and key material may be scrubbed from the client device's memory. For example, the client device 702 may call again the VerifyPin( ) function illustrated in in FIGS. 8C and 8D. The client device 702 and/or server 704 may count the number of retries performed by the user. If the number of retries exceeds a threshold, the client device 702 and/or server 704 may request the user to perform a hard authentication. If, on the other hand, the PINs match, the client device 702 may use the static entropy to decrypt additional keys and/or cryptographic vaults (e.g., vaults 616) on the client device 702. The vaults may comprise additional sensitive data, such as additional authentication keys, passwords, cookies, session tickets, inactivity timers, and other data protected by managed applications.

The foregoing validation processes have several security properties that may be beneficial if the user's client device 702 is stolen or misplaced. Sensitive data stored in the vault(s) cannot be decrypted and accessed because the time-limited server entropy might not be written to memory of the client device 702 and may be scrubbed from memory after each use. Accordingly, a thief is not able to recover the key for the static entropy, which is encrypted using the time-limited server entropy. Furthermore, the static entropy might not be written to memory of the client device 702 in clear. Rather, the static entropy may be encrypted with keys derived from the PIN and/or the time-limited server entropy. Accordingly, the encrypted static server entropy may be safely stored in either program memory or on a disk of the client device 702. The encryption keys, on the other hand, might not be stored on the disk and might be temporarily stored in program memory of the client device 702 and cleared from the memory after use. Thus, if the client device 702 is stolen, and the device's disk is read, the key to decrypt the vault(s) cannot be found in memory. Moreover, the KDF is configurable and may be modified, strengthened, or changed over time. The KDF may be configured so that the time-limited server entropy is valid for less than the expected time for a thief to run a brute force attack on the KDF function, using the data that could be recovered from a stolen client device 702. Moreover, users' PINs might not be stored in a recoverable form on the server 704. Thus, an attacker who breaks into the server 704 cannot read users' PINs.

In the examples illustrated in FIGS. 7 and 8, the client device 702 obtains the time-limited server entropy from the server 704 in order to access vault keys. In these examples, the client device 702 would have to be connected to the server 704 (e.g., via the Internet), whenever the user desires to authenticate with the user's PIN. As will be described below, users may alternatively authenticate using an authentication proxy, such as a paired device, if the client device 702 cannot connect to the server 704. Accordingly, users may use software in a protected vault even if Internet connectivity is not available.

Figure 9:
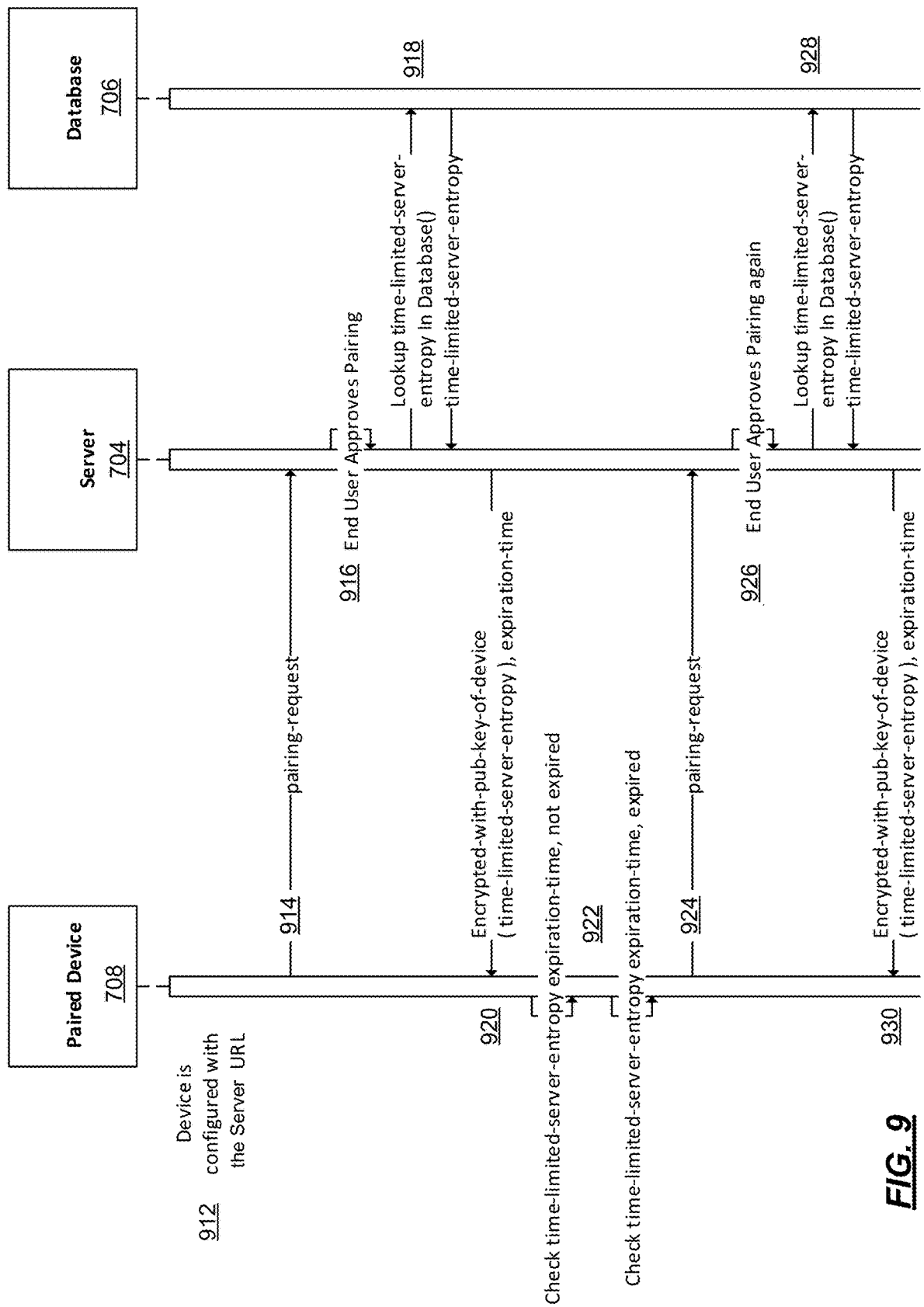
FIG. 9 illustrates an example method of registering a paired device in accordance with one or more illustrative aspects described herein.

FIG. 9 illustrates an example method of registering a paired device 708 for authenticating the client device 702 in accordance with one or more illustrative aspects described herein. As will be described below, the paired device 708 may be used to authenticate the client device 702 if the server 704 is not available. As such, the paired device 708 may serve as a proxy for the server 704. The paired device 708 may comprise any device that can be registered and/or authenticated with the server 704. In some aspects, the paired device 708 may be paired with another device, such as the client device 702, and/or with a particular user, such as the user of the client device 702. Exemplary paired devices 708 may include a mouse (e.g., the CITRIX Mouse), a smart watch, a mobile phone, a laptop computer, a desktop computer, etc. In some aspects, the paired device 708 may be wirelessly connected, such as wirelessly paired via Bluetooth, near-field communication (NFC), or Wi-Fi, or wiredly connected, such as USB, to the client device 702. The paired device 708 may also include local programmable storage.

In step 912, the device 708 may be configured with the URL of the server 704. For example, the user may manually type the server URL. Alternatively, the user may click on a URL provided in an email from a server administrator. Optionally, the user may type in a One Time Password (OTP) provided by the administrator. Alternatively, the user may click on a URL provided in an email from the administrator. The URL may contain a token, which may have been associated and pre-approved by the administrator for a specific device and user. For other devices, such as a paired mouse or smartwatch, there may be a companion application that the user may run to configure his or her device with the server URL. In the case of the mouse, the companion application may run on a paired device 708 and proxy the communication with the server 704.

In step 914, the device 708 may send a pairing request to the server 704. The pairing request may include information identifying the device 708 (e.g., make and model, MAC address, serial number, IP address, etc.) and information identifying the client device 702 and/or a user of the client device 702 (e.g., username, account number, etc.). The request may also include an OTP.

In step 916, the server 704 may receive the pairing request and request that the client device 702 and/or user approve the pairing request. For example, the server 704 may identify the client device 702 based on the information included in the pairing request and send an approval request to an application installed on the client device 702 or other device associated with the user, such as a different client device. If the user approves the pairing request, the client device 702 or other device may respond to the server's approval request. In some aspects, the pairing may be approved without user input. For example, the pairing request may include the user credentials (e.g., PIN, password, etc.), OTP, token, etc. Information from the BT or NFC connection between the client device 702 and the paired device 708 may also be used to automatically approve the request. A QR code may also be used to approve the request. For example, the server 704 may generate a QR code associated with the device 708 and to be displayed on the client device 702. The device 708 could then scan the QR code displayed on the client device 702 using, for example, a camera. The device 708 could then send the scanned QR code back to the server 704, thus completing the pairing request.

In step 918, the server 704 may look up or otherwise retrieve the time-limited server entropy from the database 706 in response to the device 708 being approved for pairing. In step 920, the server 704 may determine the expiration time of the time-limited server entropy. The server may also encrypt the time-limited server entropy with the public key of the client device 702. The server 704 may send the time-limited server entropy and the expiration time of the time-limited server entropy to the paired device 708. In some aspects, the time-limited server entropy may be encrypted, whereas the expiration time might not be encrypted. Because the time-limited server entropy is encrypted with the public key of the client device 702, the paired device 708 might not be able to read the time-limited server entropy. The expiration time, on the other hand, may be sent in clear (e.g., without encryption using the client device's key, but optionally signed by the server 704) so that the paired device 708 can read the expiration time.

The paired device 708 may locally store the encrypted time-limited server entropy and the expiration time, for future use by the client device 702. The paired device 708 may wait for a request from the client device 702 (or another device) to use the time-limited server entropy. The client device 702 accessing the time-limited server entropy stored on the paired device 708 will be described in further detail below with reference to FIGS. 10 and 11.

In step 922, the paired device may check (e.g., periodically or occasionally) whether the time-limited server entropy has expired by comparing the current time to the expiration time. If the time-limited server entropy has not expired, the paired device 708 may continue to wait for a request from the client device 702 to use the time-limited server entropy. If the time-limited server entropy has expired, the paired device 708 may again request the time-limited server entropy from the server 704 in step 924. In step 926, the server 704 may optionally obtain an approval from the user to provide the paired device 708 with the time-limited server entropy. The server 704 can be configured to request user approval for each pairing request, for the first pairing request, or via a configurable frequency (e.g., every other pairing request, every fourth pairing request, etc.).

In step 928, the server 704 may access the time-limited server entropy from the database 706. In step 930, the server 704 may determine the new expiration time of the time-limited server entropy, such as via a server (administrative) policy. The paired device 708 may query the server 704 once the expiration time of the current time-limited server entropy is reached. The server 704 may also encrypt the time-limited server entropy with the public key of the client device 702 and send the encrypted entropy and the new expiration time to the paired device 708. The paired device 708 may store the time-limited server entropy for future use by the client device 702. As previously explained, the paired device 708 may periodically or occasionally check whether the time-limited server entropy has expired.

Figure 10:
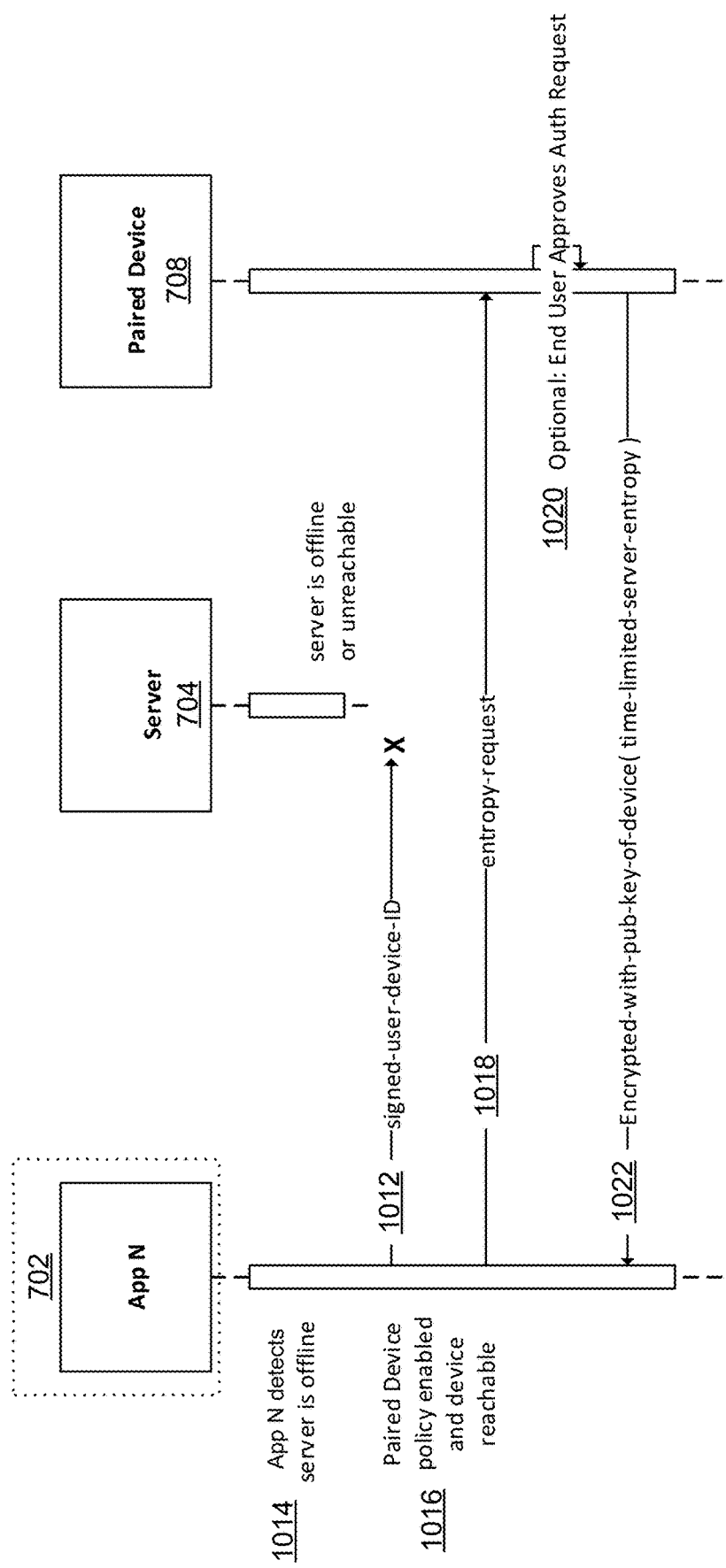
FIG. 10 illustrates an example method of authenticating a client device using a paired device in accordance with one or more illustrative aspects described herein.

FIG. 10 illustrates an example method of authenticating a client device 702 using a paired device 708 in accordance with one or more illustrative aspects described herein. In step 1012 (and similar to step 818), the client device 702 may attempt to send a request to the server 704 for the time-limited server entropy. However, the client device 702 might not receive a response to the request from the server 704 and determine, in step 1014, that the server 704 is offline or otherwise unreachable (e.g., a connection between the client device 702 and the server 704 cannot be established).

In response to determining that the server 704 is offline or otherwise unreachable, the client device 702, in step 1016, may determine whether another device, such a local device and/or a device connected to the client device 702, is reachable and/or has the time-limited server entropy. Alternatively, the client device 702 may attempt to obtain the time-limited entropy from the paired device 708 without first determining that the entropy cannot be obtained from the server 704. If the client device 702 identifies the paired device 708, the client device 702 may send, in step 1018, a request for the time-limited server entropy to the paired device 708. In step 1020, the paired device 708 may optionally receive, from the user, approval of the request for the time-limited server entropy. For example, the user may approve the request by pressing a physical or touchscreen button on the paired device 708, entering credentials for signing on to the server 704, paired device 708, and/or the client device 702, or providing other input indicating approval. Once approved, the paired device 708, in step 1022, may send the time-limited server entropy to the client device 702. As previously explained, the time-limited server entropy may be encrypted with the public key of the client device 702, and the paired device 708 might not have access to the entropy because it does not have the corresponding private key to decrypt the entropy. In other words, the paired device 708 may pass along an encrypted opaque value that the paired device 708 cannot itself interpret, read, and/or decrypt.

As previously explained with reference to FIG. 8A, the client device 702 may decrypt the encrypted time-limited server entropy and use it to decrypt the static entropy, similar to step 828 illustrated in FIG. 8A. The client device 702 may further decrypt the encrypted PIN stored at the client device 702 and compare the PIN to the PIN entered by the user, similar to step 830 illustrated in FIG. 8A. If the PINs match, the client device 702 may be granted access to additional sensitive data, such as data held in a vault at the client device 702.

Authentication without using a PIN was previously described with reference to FIGS. 7A, 7D, and 7E. Like PIN-less authentication using the server 704, PIN-less authentication may also be used when authenticating the client device 702 using the paired device 708. For example, the key for the static entropy may be generated using the time-limited server entropy, but not a PIN. Accordingly, the client device 702 may decrypt the static entropy using the time-limited server entropy received from the paired device 708, but not the PIN.

There is a security tradeoff between using a PIN and not using a PIN. A thief may be able to decrypt secure vaults without knowing the user's PIN. However, the paired device 708 may add additional layers of security in the PIN-less case (and similarly in the case using a PIN). For example, a thief that steals the client device 702 would not be able to access the time-limited entropy stored in the paired device 708 if the client device 702 is outside the communication range of the paired device 708. Accordingly, local communication network protocols having shorter communication ranges, such as Bluetooth or NFC, may be used for added security. The thief would have to steal both the client device 702 and the paired device 708 in order to decrypt the secured vaults. Moreover, the application policies can define the period of time a client device 702 may be able to fetch the time-limited server entropy from the paired device 708 and how long the entropy can be used.

Aspects described herein may be used for single sign-on (SSO) of the user over multiple devices. In other words, the data stored in encrypted vaults of a first device may be shared with other devices in the user's control. This allows the user to seamlessly roam between devices and not have to re-authenticate connections and applications when switching from one device to another.

Figure 11:
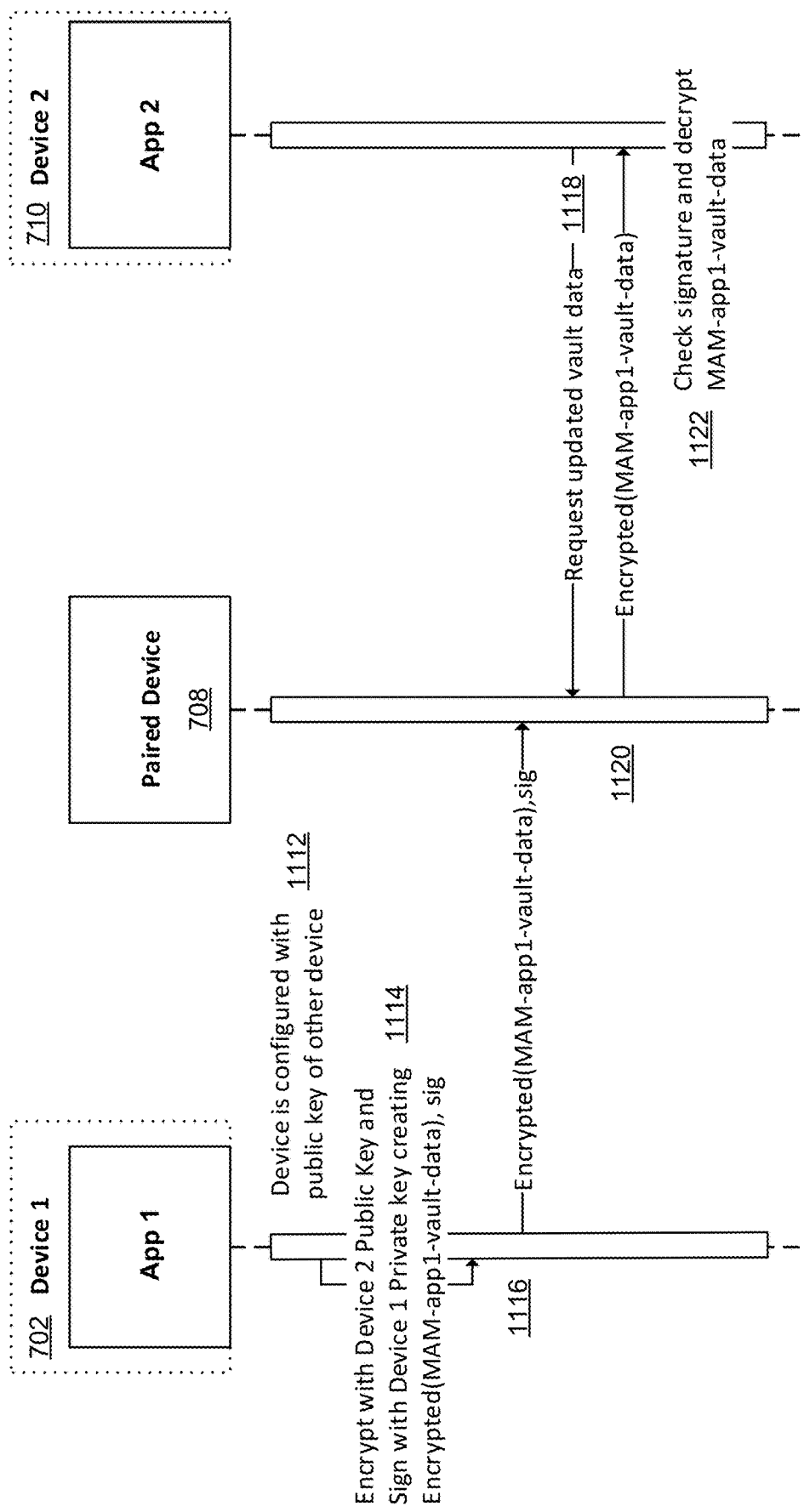
FIG. 11 illustrates an example method of a first device sharing sensitive data with a second device via a paired device in accordance with one or more illustrative aspects described herein.
Figure 12:
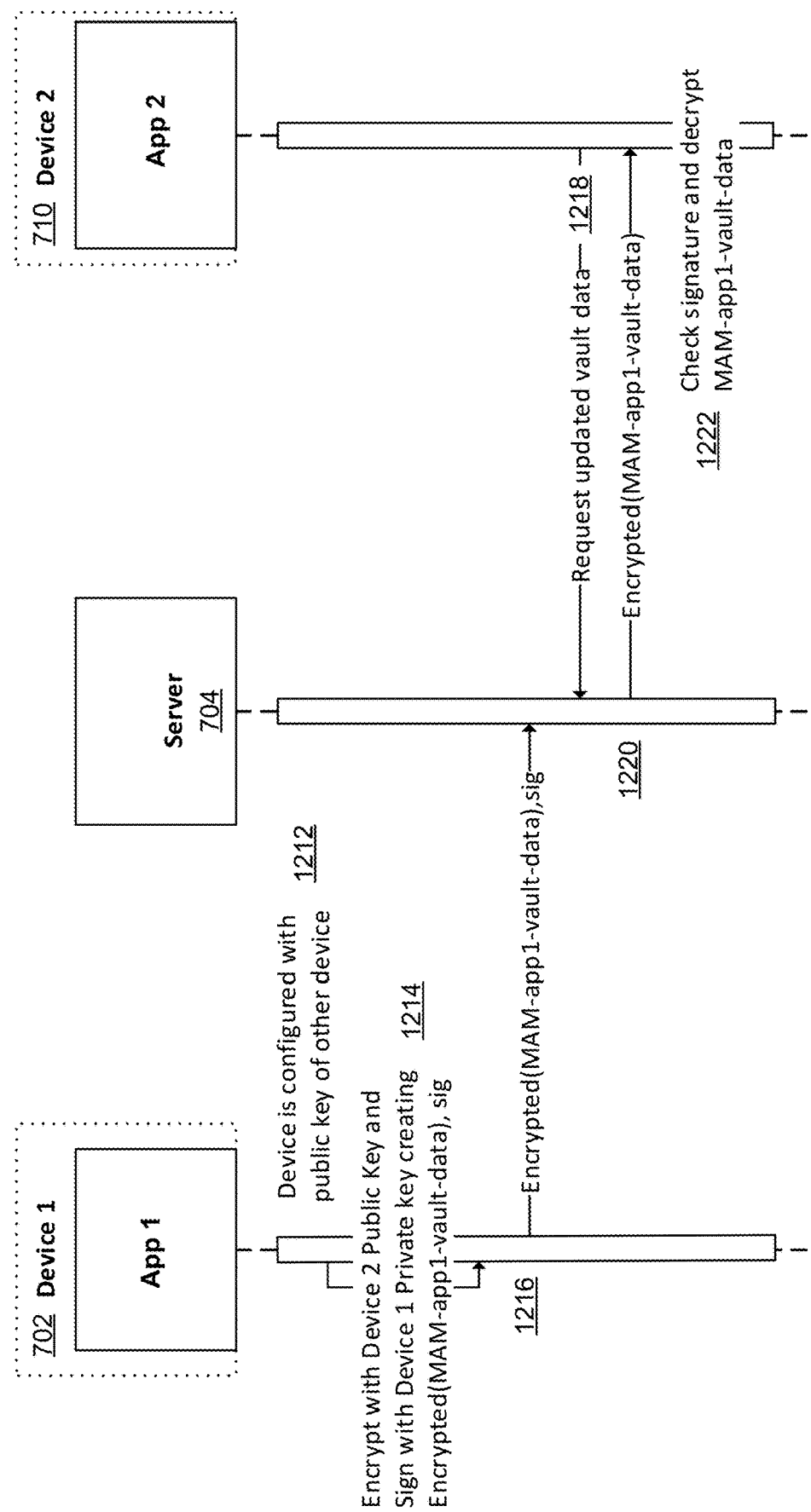
FIG. 12 illustrates an example method of a first device sharing sensitive data with a second device via a server in accordance with one or more illustrative aspects described herein.

FIG. 11 illustrates an example method of a first device 702 sharing sensitive data with a second device 710 via a paired device 708 in accordance with one or more illustrative aspects described herein. FIG. 12 illustrates an example method of the first device 702 sharing sensitive data with the second device 710 via a server 704 in accordance with one or more illustrative aspects described herein. In some aspects, the first device 702 may share sensitive data with the second device 710 via the paired device 708 if the first or second device determine that the server 704 is unavailable (e.g., the connection between the first device 702 and the server 704 and/or the connection between the second device 710 and the server 704 cannot be established). In other aspects, sensitive data may be shared via the paired device 708 without first making a determination that the server 704 is unavailable. FIGS. 11 and 12 will now be described together.

The application on the first device 702 may provide a way for the user of the first device 702 to access resources on the server 704, such as browsing corporate intranet resources using a web browser. The first device 702 may access these resources via a VPN connection, such as MicroVPN connection, to the server 704. In some aspects, the server 704 may act as a proxy allowing the web browser to access intranet resources via HTTP or HTTPS. As previously explained, the first device 702 may have vaults 616 that store sensitive data, such as authentication tickets or cookies used by the first device 702 to connect to a VPN endpoint. The vault may be encrypted by a vault encryption key that is derived from static entropy. In some aspects, accessing VPN authentication tickets may require full authentication using, for example, the user's username, password, and optionally a two-factor authentication code. From a user experience perspective, it would be advantageous to allow VPN authentication tickets to follow a user as the user switches from one device to another device.

As a brief example, assume that a managed application browser is opened on a small screen device such as a phone, and the user is reading a long document available via the intranet (e.g., at http://internal.company.tld/). The user may want to switch from the small screen device to a larger screen device, such as a tablet, to better read the document. Single sign-on to the tablet may be achieved if the VPN authentication tickets stored at the phone follow the user from the phone to the tablet. This would allow the user to instantly open the managed application browser without having to enter full authentication credentials. Inactivity timers at the phone may also follow the user to the tablet because the user is still active on the managed application.

With reference to FIGS. 11 and 12, data (e.g., VPN authentication tickets, inactivity timer, and/or other sensitive data) can be shared between two managed applications, such as App 1 on the first device 702 and App 2 on the second device 710 in two different ways. In FIG. 11, the data may be shared via the paired device 708. In this scenario, the server 704 need not be online or available for data to be shared. In some aspects, both the first device 702 and second device 710 may communicate with the paired device 708 via a short range communication protocol, such as Bluetooth, NFC, or Wi-Fi, or may be wiredly connected over USB. Alternatively and in FIG. 12, the data may be shared via the server 704.

In steps 1112 and 1212, the first device 702 may be configured with the public key of the second device 710. For example, the second device 710 may send its public key to the first device 702 directly or through a proxy, such as the paired device 708 or the server 704. Similarly, the second device 710 may be configured with the public key of the first device 702.

In steps 1114 and 1214, the first device 702 may encrypt the sensitive data (e.g., VPN authentication tickets, inactivity timer, and/or other sensitive data). The first device 702 may encrypt the data with the public key of the second device 710. The first device 702 may also sign the data with its private key. In steps 1116 and 1216, the first device 702 may send the encrypted data to the paired device 708 (FIG. 11) or the server 704 (FIG. 12). The VPN authentication tickets may be sent (e.g., shared with the paired device 708) once available in the first device 702. Alternatively, if polling is supported, the encrypted tickets may be sent on demand, and a policy may be in place to control that functionality. The paired device 708 or server 704 may verify the signature of the first device 702 and store the encrypted data locally or in a database, such as the database 706 in the case of the server 704 acting as the proxy for data transfer.

In steps 1118 and 1218, the second device 710 may request the sensitive vault data from the paired device 708 (FIG. 11) or the server 704 (FIG. 12). For example, the user may pick up the second device 710 and access the managed application, App 2, which may be the same or similar managed application as App 1 on the first device 702. The user may optionally sign on to the second device 710, such as by entering a PIN, password, or other credentials. The second device 710 may validate the credentials entered by the user.

In steps 1120 and 1220, the paired device 708 (FIG. 11) or the server 704 (FIG. 12) may send the encrypted vault data to the second device 710. As explained above, the data may be encrypted with the public key of the second device 710. In steps 1122 and 1222, the second device 710 may receive the encrypted data. The second device 710 may decrypt the data using its private key. The second device 710 may also sign a hash of the encrypted data with its private key. After the data is decrypted, the second device 710 may use the data to access one or more resources, such as corporate intranet resources via a VPN connection. As previously explained, the inactivity timer may continue running and may be included with the data sent to the second device 710. Alternatively, the second device 710 may initiate a new inactivity timer for the application.

In the foregoing examples, the server 704 acts as a source of entropy for the static entropy and time-limited entropy used by the client device 702. In alternative aspects, the system may use the paired device 708 as an additional source of entropy. With reference to FIG. 7A (e.g., at or about step 726), the paired device 708 may generate time-limited paired device entropy and send the entropy to the server 704. The paired device 708 may send the entropy directly to the server 704 or through a proxy, such as the client device 702. The paired device 708 may generate the time-limited paired device entropy using, for example, a random number generator at the paired device 708. The server 704 may receive the time-limited paired device entropy and optionally store the entropy in the database 706, which may be beneficial if the paired device 708 is lost.

In step 732, the server 704 may combine both time-limited entropy sources to generate the expiration ticket. In particular and with reference to FIG. 7D, the server 704, in step 732E, may input both the time-limited server entropy and the time-limited paired device entropy into a KDF, such as PBKDF2, in order to generate the key for the static server entropy. The server and paired device server entropies may expire at the same time or expire at different times. The server 704, in step 732F, may input both time-limited entropies (in addition to the static server entropy) to generate the key for the PIN, if a PIN is used.

In alternative aspects, the server 704 may use the time-limited paired device entropy (and not the time-limited server entropy) to generate the keys for the static server entropy and/or the PIN. In other words, the time-limited paired device entropy may replace the time-limited server entropy in the foregoing examples. The server 704 may similarly replace the static server entropy with static paired device entropy.

In some aspects, the paired device 708 may function like the server 704 with respect to managing entropy and generating keys. For example, the paired device 708 may generate its own static paired device entropy and may generate a key for the static paired device entropy using time-limited paired device entropy, without involvement by the server 704.

In some aspects, the client device 702 may generate entropy and keys for the entropy on its own, without server involvement. After the initial PIN prompt during the first time use, the client device 702 may directly use a passphrase and the PIN to generate entropy and keys. The passphrase may include enough entropy to construct the encryption keys. The client device 702 may send the generated entropy and any additional metadata (e.g., data identifying the client device 702) to the server 704 and/or database 706 for storage. After this initial modified bootstrapping step by the client device 702, the method may proceed as described above.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   transmitting, by a wireless device and to a server, a request to associate the wireless device with a client device, wherein the request comprises information indicating the wireless device and the client device;
   receiving, by the wireless device and from the server, first entropy and an expiration time for the first entropy, wherein the first entropy is generated by the server;

storing, at the wireless device, the first entropy and the expiration time for the first entropy;

establishing a wireless connection between the wireless device and the client device;

receiving, by the client device, a first user credential;

transmitting, by the client device and to the wireless device, a request for the first entropy;

receiving, by the client device and from the wireless device, the first entropy;

decrypting, by the client device and using the first entropy, second entropy generated by the server;

decrypting, by the client device and using the second entropy, a second user credential that was stored in the client device; and based on a comparison of the first user credential with the second user credential, granting a user of the client device access to one or more resources.

2. The method of claim 1, further comprising:

determining, by the client device, that a connection between the client device and the server cannot be established, wherein transmitting the request for the first entropy is performed in response to determining that the connection between the client device and the server cannot be established.

3. The method of claim 1, wherein receiving the first entropy and the expiration time for the first entropy is performed in response to the client device sending, to the server, approval for the server to send the first entropy to the wireless device.

4. The method of claim 1, wherein the request to associate the wireless device with the client device comprises one or more of the second user credential or information associated with the wireless connection.

5. The method of claim 1, wherein the first entropy received by the wireless device is encrypted using a public key of the client device, and wherein the expiration time for the first entropy is not encrypted using the public key of the client device.

6. The method of claim 1, further comprising:

after storing the first entropy and the expiration time for the first entropy, determining, by the wireless device, whether the expiration time for the first entropy has been exceeded;

in response to determining that the expiration time has been exceeded, sending, by the wireless device and to the server, a second request to associate the wireless device with the client device, wherein the second request comprises information indicating the wireless device and the client device;

receiving, by the wireless device and from the server, the first entropy and a second expiration time for the first entropy; and storing, at the wireless device, the first entropy and the second expiration time for the first entropy.

7. The method of claim 1, further comprising:

determining, by the wireless device, whether the expiration time for the first entropy has been exceeded, wherein sending the first entropy to the client device is performed in response to determining that the expiration time for the first entropy has not been exceeded.

8. The method of claim 1, wherein the wireless device comprises a wireless mouse, and wherein the wireless connection comprises a Bluetooth connection or a Near Field Communication connection.

9. The method of claim 1, wherein the wireless device comprises a mobile phone, and wherein the wireless connection comprises a Bluetooth connection, a Near Field Communication connection, or a Wi-Fi connection.

10. The method of claim 1, further comprising:

after the client device transmits, to the wireless device, the request for the first entropy, receiving, by the wireless device and from the client device, the request for the first entropy; and in response to receiving the request for the first entropy, sending, by the wireless device and to the client device, the first entropy.

11. A system comprising:

a wireless device; and a client device, wherein the wireless device comprises:

one or more first processors; and first memory storing first instructions which, when executed by the one or more first processors, cause the wireless device to:

transmit, to a server, a request to associate the wireless device with the client device, wherein the request comprises information indicating the wireless device and the client device;

receive, from the server, first entropy and an expiration time for the first entropy, wherein the first entropy is generated by the server;

store the first entropy and the expiration time for the first entropy; and establish a wireless connection with the client device, wherein the client device comprises:

one or more second processors; and second memory storing second instructions which, when executed by the one or more second processors, cause the client device to:

receive a first user credential;

transmit, to the wireless device, a request for the first entropy;

receive, from the wireless device, the first entropy;

decrypt, using the first entropy, second entropy generated by the server;

decrypt, using the second entropy, a second user credential stored in the client device; and based on a comparison of the first user credential with the second user credential, grant a user of the client device access to one or more resources.

12. The system of claim 11, wherein the second instructions, when executed by the one or more second processors, further cause the client device to:

determine that a connection between the client device and the server cannot be established, wherein transmitting the request for the first entropy is performed in response to determining that the connection between the client device and the server cannot be established.

13. The system of claim 11, wherein receiving the first entropy and the expiration time for the first entropy is performed in response to the client device sending, to the server, approval for the server to send the first entropy to the wireless device.

14. The system of claim 11, wherein the request to associate the wireless device with the client device comprises one or more of the second user credential or information associated with the wireless connection.

15. The system of claim 11, wherein the first entropy received by the wireless device is encrypted using a public key of the client device, and wherein the expiration time for the first entropy is not encrypted using the public key of the client device.

16. The system of claim 11, wherein the first instructions, when executed by the one or more first processors, further cause the wireless device to:
- after storing the first entropy and the expiration time for the first entropy, determine whether the expiration time for the first entropy has been exceeded;
- in response to determining that the expiration time has been exceeded, send, to the server, a second request to associate the wireless device with the client device, wherein the second request comprises information indicating the wireless device and the client device;
- receive, from the server, the first entropy and a second expiration time for the first entropy; and
- store the first entropy and the second expiration time for the first entropy.

17. The system of claim 11, wherein the first instructions, when executed by the one or more first processors, further cause the wireless device to:
- determine whether the expiration time for the first entropy has been exceeded, wherein sending the first entropy to the client device is performed in response to determining that the expiration time for the first entropy has not been exceeded.

18. The system of claim 11, wherein the wireless device comprises a wireless mouse, and wherein the wireless connection comprises a Bluetooth connection or a near-field communication connection.

* * * * *